United States Patent
Maruyama et al.

(10) Patent No.: US 7,577,145 B2
(45) Date of Patent: Aug. 18, 2009

(54) PACKET COMMUNICATION METHOD, COMMUNICATION SYSTEM, COMMUNICATION APPARATUS, COMMUNICATION PROGRAM AND RECORDING MEDIUM CONTAINING COMMUNICATION PROGRAM

(75) Inventors: Kazuhito Maruyama, Tenri (JP); Yoshihiro Ohtani, Kyoto (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1050 days.

(21) Appl. No.: 10/482,852

(22) PCT Filed: Jul. 2, 2002

(86) PCT No.: PCT/JP02/06704

§ 371 (c)(1),
(2), (4) Date: Jan. 5, 2004

(87) PCT Pub. No.: WO03/005674

PCT Pub. Date: Jan. 16, 2003

(65) Prior Publication Data

US 2004/0179523 A1    Sep. 16, 2004

(30) Foreign Application Priority Data

Jul. 6, 2001  (JP) .............................. 2001-205519

(51) Int. Cl.
*H04L 12/28* (2006.01)
(52) U.S. Cl. .................. 370/392; 709/238; 714/746
(58) Field of Classification Search ............... None
See application file for complete search history.

(56) References Cited

U.S. PATENT DOCUMENTS

| | | | |
|---|---|---|---|
| 6,018,371 A | 1/2000 | Maeda et al. | |
| 6,310,858 B1 * | 10/2001 | Kano et al. | 370/235 |
| 6,310,866 B1 * | 10/2001 | Kronestedt et al. | 370/330 |
| 6,519,062 B1 * | 2/2003 | Yoo | 398/49 |
| 6,760,309 B1 * | 7/2004 | Rochberger et al. | 370/235 |
| 7,126,944 B2 * | 10/2006 | Rangarajan et al. | 370/389 |
| 7,170,896 B2 * | 1/2007 | Battin | 370/401 |
| 2001/0014909 A1 | 8/2001 | Yoshida | |
| 2002/0163935 A1 * | 11/2002 | Paatela et al. | 370/466 |

FOREIGN PATENT DOCUMENTS

JP    6-112944 A    4/1994

(Continued)

OTHER PUBLICATIONS

"Medium Access Control Enhancements for Quality of Service," IEEE 802.11e/D1, Mar. 2001, pp. 63-64.

(Continued)

*Primary Examiner*—Bob A Phunkulh
(74) *Attorney, Agent, or Firm*—Birch, Stewart, Kolasch & Birch, LLP

(57) ABSTRACT

To transmit a packet to be transmitted, a transmitting station specifies information indicating an expiration time for the packet. Upon receiving the packet, a receiving station analyzes the expiration time information to output data to the upper layer based on the information. This enables more efficient transmission while following the Strict Order, in a transmission/receipt system where realtime data is transfer using a collective DELAYED-ACK returned instead of ACKs for multiple packets.

72 Claims, 13 Drawing Sheets

FOREIGN PATENT DOCUMENTS

| | | |
|---|---|---|
| JP | 7-321849 A | 12/1995 |
| JP | 9-191314 A | 7/1997 |
| JP | 11-225168 A | 8/1999 |
| JP | 2000-165440 A | 6/2000 |
| JP | 2000-242397 A | 9/2000 |
| JP | 2000-307640 A | 11/2000 |
| JP | 2001-167012 A | 6/2001 |

OTHER PUBLICATIONS

Y. Ohtani, "Normative Text for Timestamp field," IEEE 802.11-01/452r0, Jul. 9, 2001, pp. 1-2.

Y. Ohtani, "Proposed Timestamp Field for Strictly Ordered Indication," IEEE 802.11-01/425r0, Jul. 10, 2001, slides 1-9.

A. P. Stephens, et al., "Burst Acknowledgement Mechanism," IEEE 802.11-01/126r1, Nov. 14, 2001, pp. 1-5.

* cited by examiner

PACKET COMMUNICATION METHOD, COMMUNICATION SYSTEM, COMMUNICATION APPARATUS, COMMUNICATION PROGRAM AND RECORDING MEDIUM CONTAINING COMMUNICATION PROGRAM

TECHNICAL FIELD

The present invention relates to, among others, a packet communications method, communications system, and communications device which, in packet transmission/receipt, manages expiration time for data in the packet.

BACKGROUND ART

The IEEE 802.11 wireless LAN communications standard (in compliance with ANSI/IEEE Std. 802.11, 1999 Edition) specifies that in the MAC Layer, data packets are output to the upper layer in the receiving station in the same order as their transmissions (Strict Order). According to the IEEE 802.11 standard, Sequence Numbers, given sequentially to all transmitted data packets, are contained in the headers of the data packets so that the data packets are uniquely identified. The Sequence Numbers are used for the following process: Having receives a data packet from the transmitting station, the receiving station returns an acknowledge (Ack) to the transmitting station so that the transmitting station checks the Ack for the data packet. After checking the Ack, the transmitting station starts the transmission of a next data packet.

Under these circumstances, if there is a data packet for which the transmitting station has failed to receive an Ack from the receiving station, the transmitting station transmits that data packet again to the receiving station. The packet is discarded by the receiving station if the receiving station has previously received a packet having the same Sequence Number.

If the receiving station cannot receive the data packet after the transmitting station's repeated attempts, the transmitting station gives up transmitting it and starts to transmit a next data packet. This results in discontinuous data packets, hence, discontinuous Sequence Numbers, being received by the receiving station. Still, the Strict Order is regarded as being followed, because none of the Sequence Numbers are transposed. Upon receiving the data packet, the receiving station outputs data in the data packet to the upper layer.

Lately, there is increasing demand for wireless transmission of video, audio, and other realtime data. To transmit realtime data, data packets must be transmitted within a certain delay time. It is therefore preferred if attention is paid to the transmission expiration time for each data packet in the MAC Layer. This is because if only the upper layer knows the transmission expiration time for each data packet, whereas the MAC Layer does not, the MAC Layer keeps repeating the transmission of a data packet even after the expiration time of that packet, reducing effective data transmission efficiency.

Taking these facts into consideration, the IEEE 802.11e standard, an extension to 802.11 (in compliance with IEEE Std 802.11e/D1, Mar.2001), defines that in the MAC Layer, each packet has a transmission expiration time termed a lifetime. The lifetime indicates how long the data will be stored in the transmitting station. The countdown of the lifetime starts when the transmitting station inputs data from the upper layer to the MAC Layer. The data packet out of lifetime is discarded by the transmitting station without prior notice to the receiving station. The transmitting station never retransmits the data after that, even if the receiving station has not successfully received it. All packets are at default set to have an equal lifetime in typical systems.

In realtime data transmissions error correction code is often used to restrain the number of retransmissions per unit time. A drawback to this approach is that error correction decoding takes so much time that an Ack cannot be returned immediately. A technique addressing the problem is suggested where acknowledges for a set of data packets are collectively transmitted in a single packet termed a DELAYED-ACK.

A DELAYED-ACK contains a bitmap in which one bit is assigned to each Sequence Number of successive data packets. The data receiving station sets the bit to 1 if the station has successfully received the data packet identified by the Sequence Number. The receiving station returns to the transmitting station a DELAYED-ACK prepared this way, inclusive of information on the first one of the Sequence Numbers of the data packets for which an acknowledge is to be returned and on the number of acknowledges contained.

The DELAYED-ACK entails following problems, for example, when used in a video, audio, or other realtime data transmission where the receiving station receives data packets as described in the foregoing in a different sequence from that in which the transmitting station transmitted the packets. When this happens, the receiving station sends a data packet retransmission request, and does not output received data packets to the upper layer, but buffers them so as to follow the Strict Order. The receiving station may therefore fail to obtain expiration time for the received data packets and determine up to when the received data packets should be output to the upper layer. In other words, attempts to follow the Strict Order possibly result in expiration of the received data packets. The data packets are wasted.

FIG. 13 illustrates an example of the data packet flow in such cases. The data packet is transferred from the transmitting station upper layer to the transmitting station MAC Layer, then the receiving station MAC Layer, and the receiving station upper layer. An example is shown by packets 701a, 701b, 701c, 701d in the figure demonstrating the transfer of a data packet 1 from one layer to another. For example, as to the data packet 1, the packet 701a is input from the upper layer to the MAC Layer; then, in the MAC Layer, the packet 701b is transmitted at a timing determined by the protocols. The receiving station determines whether the packet 701c has been successfully received before outputting it to the upper layer as the packet 701d.

Each data packet has an expiration time, set to a certain value, for the time taken from the input from the transmitting station upper layer to the output to the receiving station upper layer. For example, the data packet 1 must reach the receiving station upper layer by an expiration time 701e shown in FIG. 13. After the expiration time, the data packet is discarded by the transmitting station without notifying the receiving station. Thereafter, no retransmission will be made in response to a retransmission request from the receiving station.

The expiration times 701e, 702e, 704e, 706e, 707e for the data packets 1, 2, 4, 6, 7 in FIG. 13 are estimates calculated by the receiving station according to an equation: Expiration Time=Time of First-time Packet Receipt+Lifetime. The expiration time 704e is for a retransmitted data packet and does not match the expiration time at the transmitting end.

Still referring to FIG. 13, the packet 703c for the data packet 3 is shown to have not been received by the receiving station for some reason or have not been successfully received due to an error in the data in the data packet.

The MAC Layer of the receiving station records whether data packets have been successfully received and transmits DlyAcks 710, 711 corresponding to a DELAYED-ACK when the received data packets has reached a certain number. The DlyAck 710 notifies that the packet 701c corresponding to the data packet 1 and the packet 702c corresponding to the data packet 2 have been successfully received. Upon receipt of the DlyAck 710, the MAC Layer of the transmitting station determines that the receiving station has not received the packet 703b corresponding to the data packet 3 and the packet 704b corresponding to the data packet 4. The packets are retransmitted as packets 703b1, 704b1.

Similarly, the DlyAck 711 notifies the transmitting station that the receiving station has successfully received packets except the packet 703b corresponding to the data packet 3 and the packet 705b corresponding to the data packet 5. Upon receipt of the DlyAck 711, the transmitting station retransmits the packet 705b1 corresponding to the data packet 5 based on the DlyAck 711, but not the packet 703b corresponding to the data packet 3, because the transmitting station knows that the expiration time for the data packet 3 has already past.

The receiving station outputs received data packets, e.g., the packets 701d, 702d, to the upper layer provided that the Strict Order is followed. On the other hand, if the Strict Order is not followed, in other words, if there is a data packet yet to be successfully received bearing a smaller number than a newly received data packet, the received data packet is buffered. In this example, the data packet 3 has not reached the MAC Layer of the receiving station. The packet 704c corresponding to the data packet 4, the packet 705c corresponding to the data packet 5, the packet 706c corresponding to the data packet 6, and the packet 707c corresponding to the data packet 7, although successfully received by the receiving station, are buffered in the MAC Layer of the receiving station until the packet 703c corresponding to the data packet 3 is received.

If the packet 703b corresponding to the data packet 3 is not successfully transferred to the receiving station before the expiration time for the data packet 3, the packet 703b corresponding to the data packet 3 is discarded by the transmitting station as mentioned earlier; the receiving station needs to determine one way or the other when to give up receiving the packet 703d corresponding to the data packet 3.

In this example, the transmitting station must have transmitted the packet 703b corresponding to the data packet 3 before the packet 704b corresponding to the data packet 4. Accordingly, the expiration time for the data packet 3 is reasonably estimated to come before the time of receiving the packet 704c1 corresponding to the data packet 4, plus the lifetime. However, the expiration time for a data packet is a time starting when the data packet is input from the upper layer to the MAC Layer in the transmitting station. The receiving station alone can at best estimate an expiration time for each data packet, let alone know the exact expiration time. There is a problem especially worth mentioning here: In the example, the packet 704c1 corresponding to the data packet 4 is successfully received by the receiving station in the second transmission, not in the first transmission, of the packet 704b corresponding to the data packet 4 from the transmitting station. The transmitting station is set to automatically retransmit a data packet if it does not receive an Ack in a certain period of time. Therefore, if the expiration time 3 for the packet 703d corresponding to the data packet 3 is determined based on the estimate, the receipt of the packet 703d corresponding to the data packet 3 is awaited in some cases even after the expiration time is past for the packets following the packet 704d corresponding to the data packet 4; when the successful received data packets following the packet 704d corresponding to the data packet 4 are output to the upper layer, they are no longer valid.

Video and other realtime data is transmitted using, for example, MPEG2-TS specifying that time information is added to the data packet by an encoder upon the generation of the packet. To reproduce MPEG2-TS data packets, a decoder is used to recover the time information based on which the reproduction is carried out.

The time information according to MPEG2-TS is added for use in the encoder and the decoder. The time information is based on a different clock from the one for the time information used in the communication path (MAC Layer). It is therefore difficult to apply the time information added in MPEG2-TS to determine the expiration time for data packets in the communication path. In some cases, TS packets are merged or divided in transmission to facilitate communications. Conventional art does not consider adding expiration time information to those merged/divided packets.

Conceived to address the problems, the present invention has an objective to offer a packet communications method, communications. system, communications device, communications program, and storage medium containing the communications program, which allows for more accurate knowledge of packet expiration times for efficiency-improved transmission following the Strict Order.

SUMMARY OF INVENTION

In order to solve the problems, a packet communications method in accordance with features consistent with the present invention is characterized in that it includes the step of transmitting a packet containing expiration time information for the packet or for a body of the packet either in the body or in a header of the packet.

Another packet communications method in accordance with features consistent with the present invention is characterized in that it includes the step of, when receiving a packet containing expiration time information for the packet or for a body of the packet either in the body or in a header of the packet, determining an expiration time for the packet based on the expiration time information.

According to the method, the expiration time information for the packet or its body is contained in the transmitted/received packet header or body. A receiving station, having received such a packet, can know the expiration time for the packet corresponding to the expiration time information more precisely by analyzing the expiration time information in the packet. Received packets are therefore not wasted due to expiration. The Strict Order is efficiently realized.

A communications system in accordance with features consistent with the present invention is a communications system including a transmitting station transmitting packets and a receiving station receiving packets, and is characterized in that the transmitting station includes:

packet generating means for converting data to be transmitted to a predetermined packet;

expiration time calculating means for calculating an expiration time for at least part of data in the packet; and expiration time appending means for appending expiration time information on the expiration time to the packet, and the receiving station includes expiration time determining means for determining expiration time for the packet on the basis of the expiration time information in a received packet.

According to the arrangement, first, in the transmitting station, expiration time information on an expiration time for at least part of data in a packet to be transmitted is appended to the packet, and a packet containing the expiration time information is transmitted to the receiving station. Having received such a packet, the receiving station determines the expiration time of the packet on the basis of the expiration time information in the packet. The receiving station can thereby know the expiration time for the received packet more precisely. Received packets are therefore not wasted due to expiration. The Strict Order is efficiently realized.

Another communications system in accordance with features consistent with the present invention is a communications system including a transmitting station transmitting packets and a receiving station receiving packets, and is characterized in that the transmitting station includes:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information, and the receiving station includes expiration time determining means for determining expiration time for a received packet on the basis of the expiration time information in a received expiration time information packet.

According to the arrangement, first, the transmitting station generates an expiration time information packet containing expiration time information on the expiration time and identity information for data corresponding to the expiration time information, and transmits the expiration time information packet to the receiving station. Upon receiving the expiration time information packet, the receiving station determines expiration time for the packet received so far, on the basis of the expiration time information and identity information in the expiration time information packet. The receiving station can thereby know the expiration time for the received packet more precisely. Received packets are therefore not wasted due to expiration. The Strict Order is efficiently realized.

A communications device in accordance with features consistent with the present invention is a communications device connected to a communications system, and is characterized in that it includes:

a transmission buffer buffering incoming transmitted data;

a timer managing time;

a generator generating an expiration time for a packet to be transmitted in the form of a time stamp;

a packet processor packetizing the data to be transmitted and the time stamp; and a protocol controller transmitting the packet generated by the packet processor.

According to the arrangement, the time stamp generator generates an expiration time for a packet to be transmitted in the form of a time stamp; the packet processor packetizes the data to be transmitted and the time stamp; and the protocol controller transmits the packet to the receiving station. Having received such a packet, the receiving station can know the expiration time for the packet corresponding to the expiration time information more precisely by analyzing the expiration time information in the packet. Received packets are therefore not wasted due to expiration. The Strict Order is efficiently realized.

Another communications device in accordance with features consistent with the present invention is a communications device connected to a communications system, and is characterized in that it includes:

a protocol controller receiving a packet from an external communications device;

a packet processor dividing the received packet into received data and a time stamp and associating the data and the stamp;

a receipt buffer buffering the received data; and a time stamp analyzer analyzing the time stamp so as to instruct for an output of the received data from the receipt buffer to an upper layer when an output time for the received data corresponding to the time stamp has come.

According to the arrangement, the protocol controller receives a packet; the packet processor extracts received data and a time stamp from the received packet; and the time stamp analyzer analyzes the time stamp so as to instruct for an output of the received data from the receipt buffer to an upper layer when an output time for the received data corresponding to the time stamp has come. The receiving station can thereby know the expiration time for the received packet more precisely. Received packets are therefore not wasted due to expiration. The Strict Order is efficiently realized.

To describe the expiration time in absolute time, a mechanism is needed to synchronize the clock for the transmitting station and the receiving station. The mechanism is readily incorporated, because in the receiving station, the packet only needs to be output to the upper layer immediately before a designated time.

To describe the expiration time in relative time, an expiration time needs to be counted for each received packet. Such a mechanism is incorporated without a mechanism synchronizing the clock for the transmitting station and the receiving station.

The expiration time can be described using a variable, in which case, time management becomes unnecessary for each packet.

Additional advantages and novel features of the invention will be set forth in part in the description which follows, and in part will become apparent to those skilled in the art upon examination of the following or may be learned by practice of the invention.

DETAILED DESCRIPTION

EMBODIMENT 1

The following will describe an embodiment of the present invention with reference to figures.

In the present embodiment, expiration time information is expressed in absolute time. Each data packet, when transmitted from a transmitting station to a receiving station, contains expiration time information.

Figure 1:
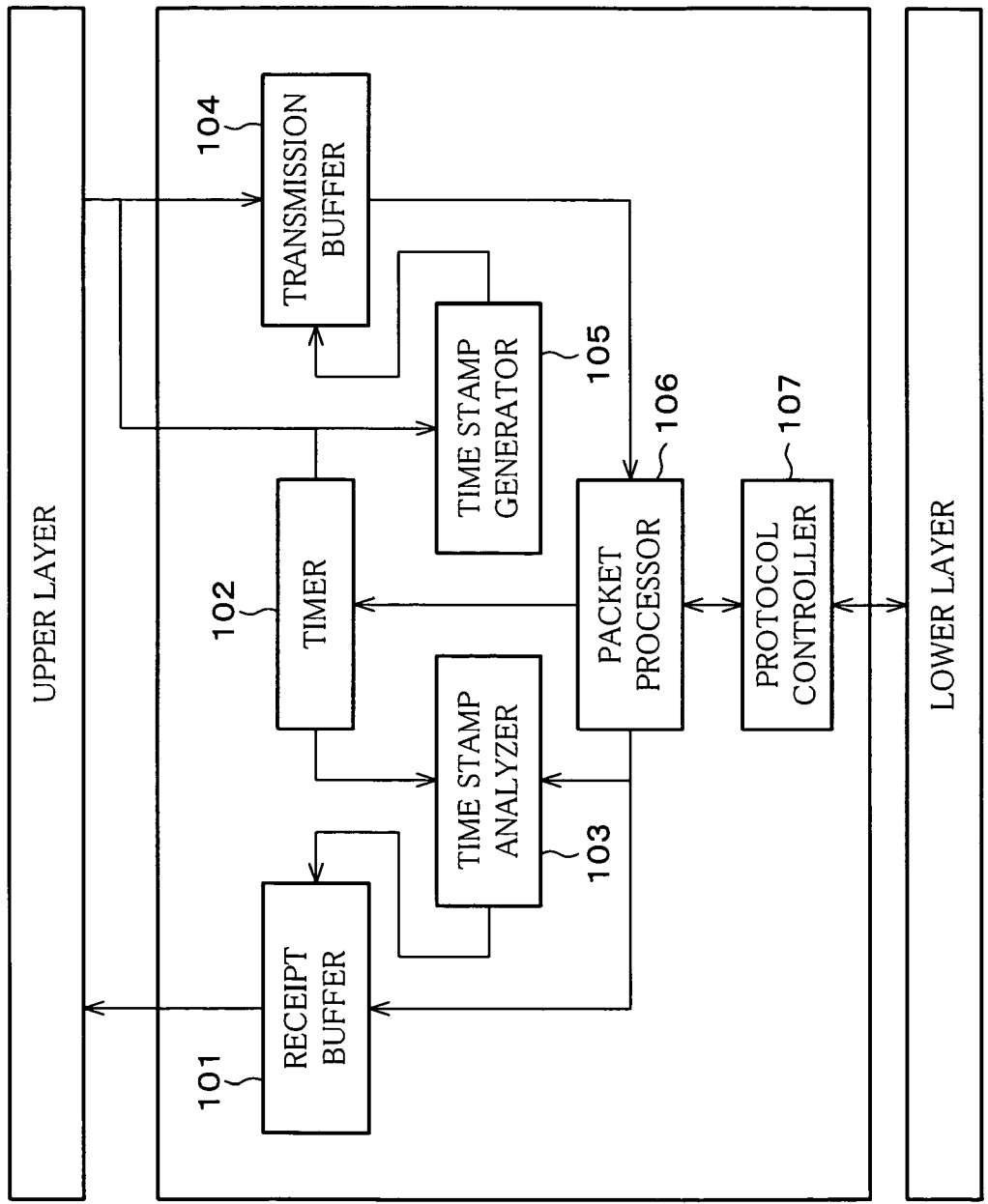
FIG. 1 is a block diagram schematically showing the arrangement of a transmitter device in accordance with an embodiment of the present invention.

FIG. 1 is a block diagram schematically illustrating the arrangement of a transmitter device in accordance with the present embodiment. Referring to the figure, the transmitter device includes: a receipt buffer 101, a timer 102, a time stamp analyzer 103, a transmission buffer 104, a time stamp generator 105, a packet processor 106, and a protocol controller 107. The transmitter device provides a MAC Layer according to the IEEE 802.11 wireless communications standard (in compliance with ANSI/IEEE Std. 802.11, 1999 Edition). In other words, the transmitter device provides a MAC Layer in the data packet transmitting and receiving stations.

Figure 6:
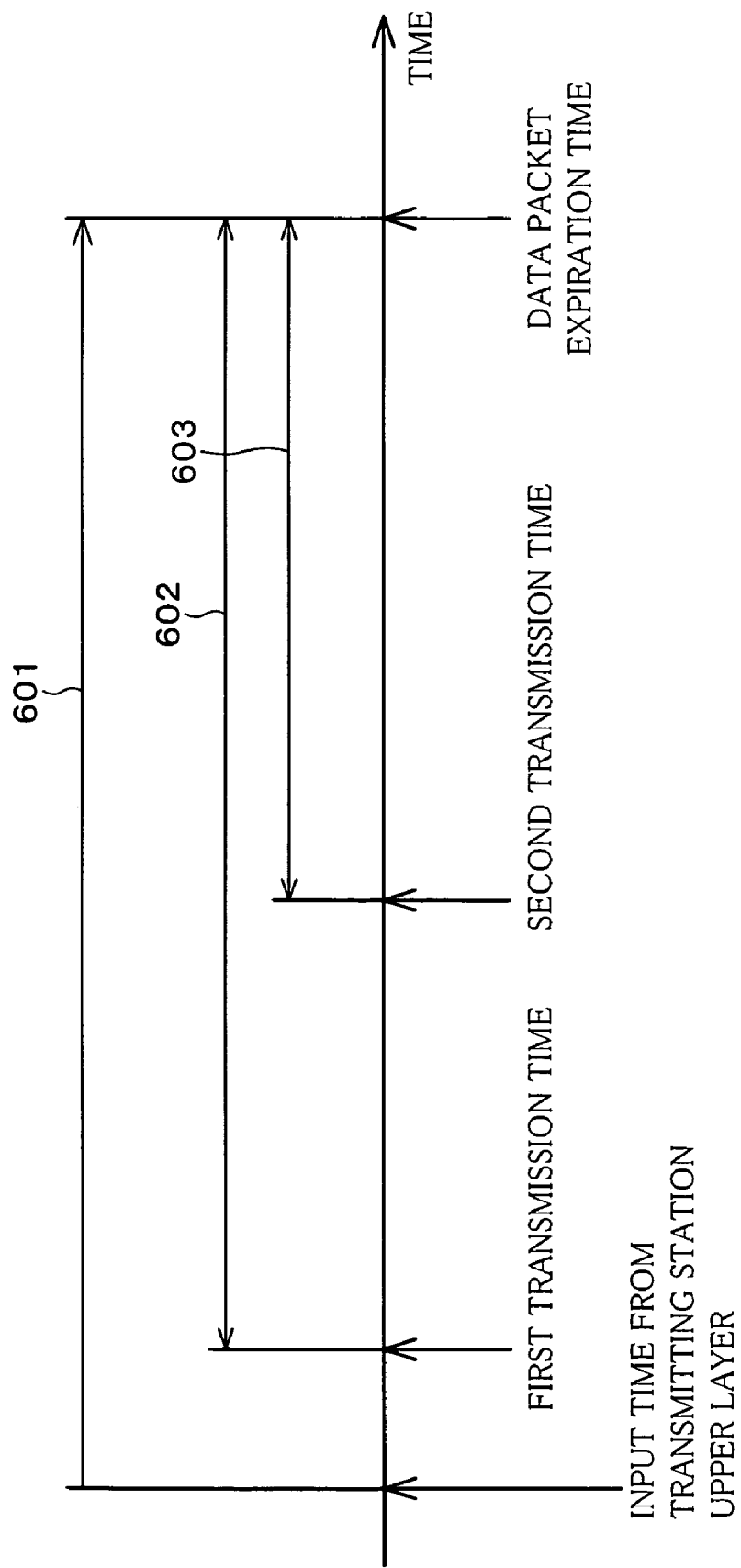
FIG. 6 shows, on a horizontal axis representing absolute time, a time when a data packet is input from a transmitting station upper layer to the MAC Layer, a time when the data packet is transmitted from the transmitting station MAC Layer for the first time, a time when the data packet is transmitted from the transmitting station MAC Layer for the second time, and the expiration time of the data packet.

First, the foregoing elements will be described in terms of operation in the transmitting station. The time stamp generator 105 is a block calculating an expiration time, in the receiving station, of data fed from the upper layer according to an equation: Time of Input from Upper Layer+Lifetime. The section 105 then sets a data packet expiration time recorded using a time stamp (detailed later) to the calculated result. FIG. 6 shows how to calculate data packet expiration times. The period identified by 601 in the figure corresponds to a lifetime. The data packet expiration time is recorded using a time stamp.

The generated data packet expiration time and the data input from the upper layer are transferred to a transmission buffer 104 in association with each other. When time has arrived to transmit the data from the transmission buffer 104, the packet processor 106 generates data packets based on the data held by the transmission buffer 104.

Figure 2:
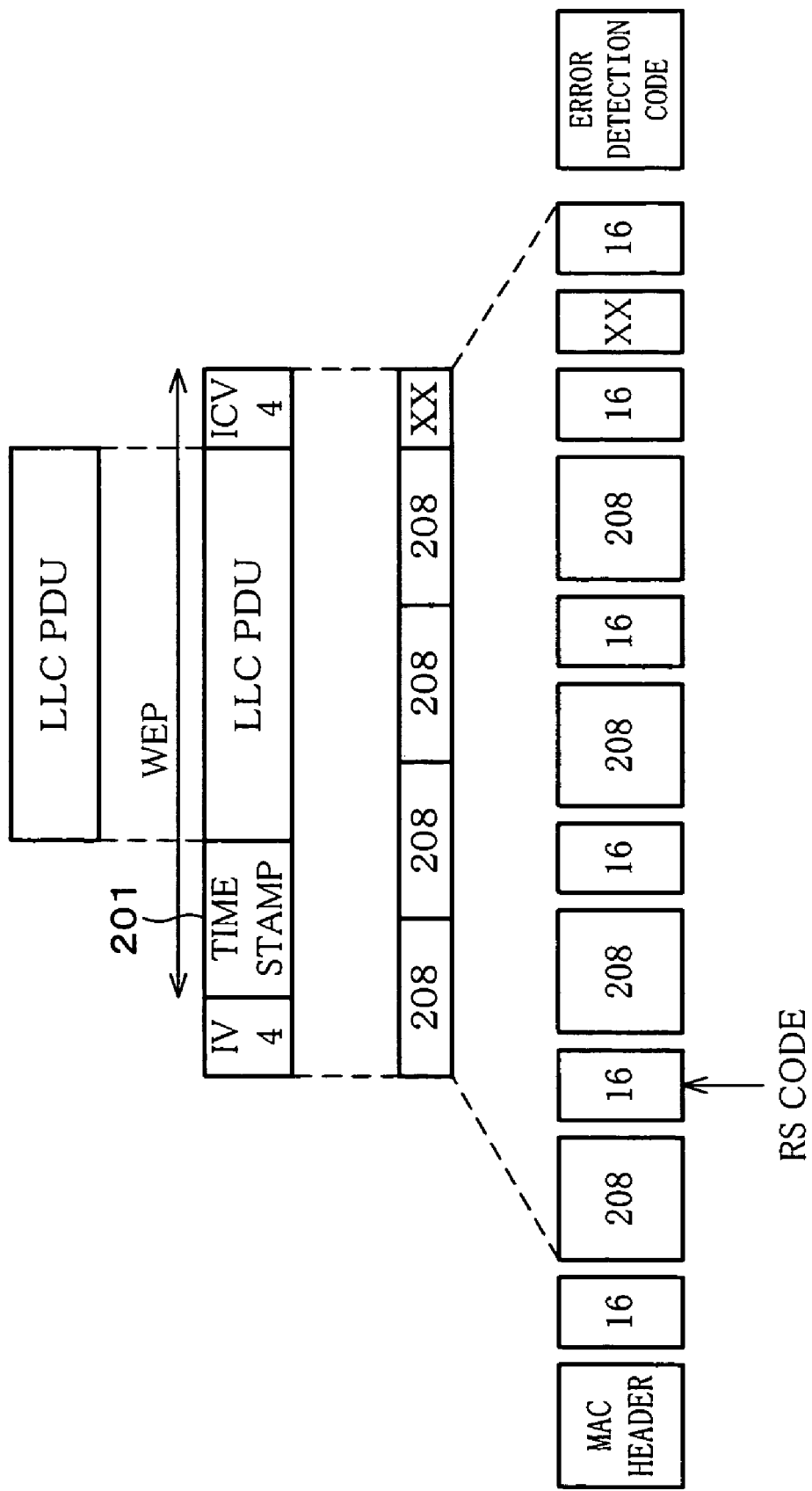
FIG. 2 shows a data packet format as an example.
Figure 3:
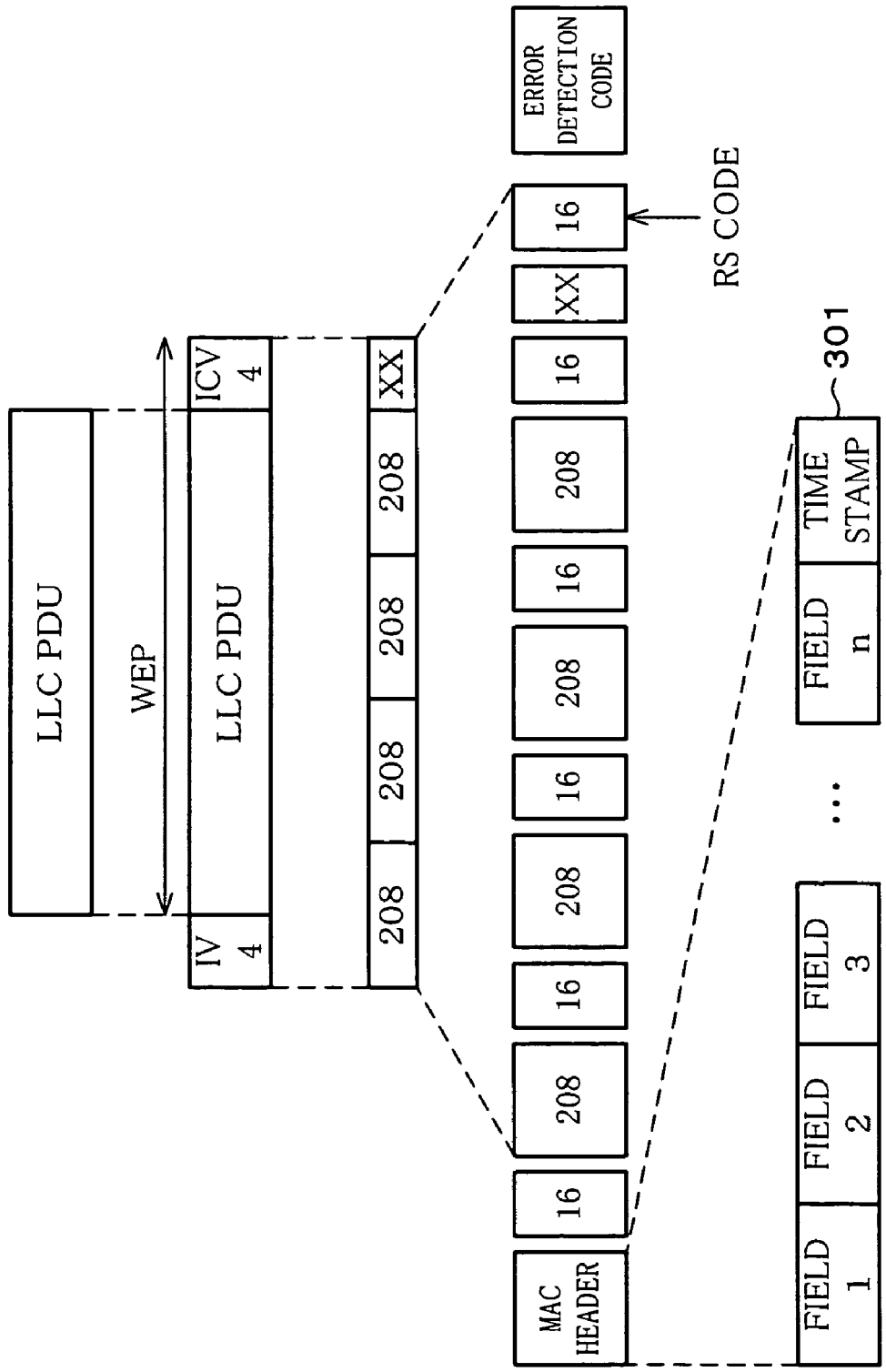
FIG. 3 shows another example of a data packet format.

FIGS. 2, 3 show data packet format examples. In these format examples, each data packet is made up of a header and a body consisting of data of a MAC Layer. In the format example in FIG. 2, a time stamp field 201 is provided in the body. The time stamp field 201 may be flanked by other fields in the body. Meanwhile, in the format example in FIG. 3, a time stamp field 301 is provided in a field in the MAC header. The time stamp field, whether provided as in FIG. 2 or FIG. 3, produces no substantial differences in operation.

The data packet generated by the packet processor 106 in this manner is output to the lower layer and sent out in accordance at a timing defined by the protocol under the control of the protocol controller 107.

Next, the elements will be described in terms of operation in the receiving station. A data packet is input from the lower layer to the protocol controller 107. The data packet is then separated into a time stamp segment and a data segment by the packet processor 106. The time stamp segment is transferred to the time stamp analyzer 103. The data segment is transferred to the receipt buffer 101.

The time stamp analyzer 103 monitors the timer 102. Some time before the expiration time of the received data, the section 103 instructs the receipt buffer 101 to output the corresponding data stored in the buffer 101 to the upper layer.

The transmitting station does not transmits, to the receiving station, data which has already expired or which is likely to expire after receipt by the receiving station. The receiving station, if having failed to receive correct data by expiration time, may suspend retransmission requests to the transmitting station or notifies the upper layer that the data has not correctly been received.

Figure 4:
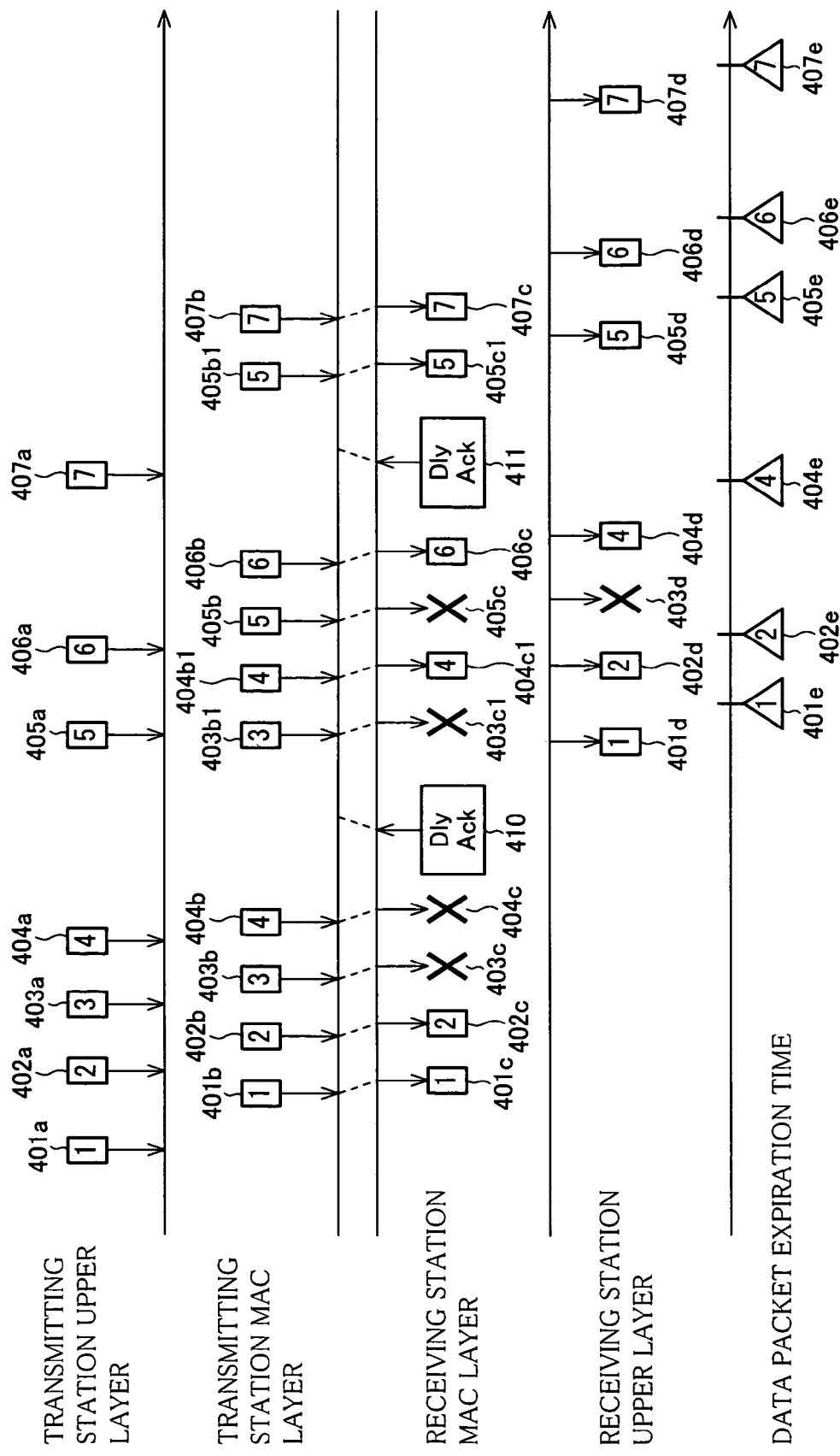
FIG. 4 shows, as an example, a data packet flow in a transmission by the transmitter device.

A data packet flow example in a transmission involving the transmitter device is shown in FIG. 4. The expiration times (401e, 402e, 404e, 405e, 406e, 407e in the figure) for the data packets specified in the receiving station upper layer are determined with reference to expiration time information transferred from the transmitting station to the receiving station. Therefore, the expiration times for the data packets specified by the transmitting station match those specified by the receiving station.

In FIG. 4, the data packet is transferred from a transmitting station upper layer to the transmitting station MAC Layer, then the receiving station MAC Layer, and the receiving station upper layer. An example of the layer-to-layer transfer of the data packet 1 is shown by a packet 401a in the transmitting station upper layer, a packet 401b in the transmitting station MAC Layer, a packet 401c in the receiving station MAC Layer, and a packet 401d in the receiving station upper layer.

For example, as to the data packet 1, the packet 401a in the transmitting station upper layer is input to the transmitting station MAC Layer. In the transmitting station MAC Layer, the packet 401b in the transmitting station MAC Layer is transmitted to the receiving station at a transmission timing according to the protocol. The receiving station determines whether the packet 401c has been successfully received in the receiving station MAC Layer, and if so, outputs the packet 401d to the receiving station upper layer.

Each data packet has an expiration time set to a certain value for the time taken by the packet from the input to the transmitting station MAC Layer to the output to the receiving station upper layer. For example, the data packet 1 is should be output to the receiving station upper layer before the expiration time 401e which is recognizable to both the transmitting station and the receiving station. Expired data is discarded by the transmitting station without notifying the receiving station, and never retransmitted thereafter in response to a retransmission request from the receiving station.

In FIG. 4, the packet 403c corresponding to the packet 3 in the receiving station MAC Layer is shown to have not been received by the receiving station MAC Layer for some reasons or have not been successfully received due to an error in the data in the data packet (failed receipt). The receiving station MAC Layer records whether data packets have been successfully received and transmits DlyAcks 410, 411 corresponding to a DELAYED-ACK to the transmitting end when the received data packets has reached a certain number. The DlyAck 410 notifies that the packet 401c corresponding to the data packet 1 and the packet 402c corresponding to the data packet 2 have been successfully received by the receiving station MAC Layer.

Upon receipt of the DlyAck 410, the transmitting station MAC Layer determines that the receiving station has not successfully received the packet 403b corresponding to the data packet 3 and the packet 404b corresponding to the data packet 4, both transmitted from the transmitting station MAC Layer. The transmitting station MAC Layer transmits to the receiving station the packets 403b1, 404b1 corresponding respectively to the data packets 3, 4 which have not successfully been received.

Similarly, the DlyAck 411 indicates that the receiving station has up to the time successfully received packets except the packet 403b1 corresponding to the data packet 3 and the packet 405b corresponding to the data packet 5 in the transmitting station MAC Layer. Upon receipt of the DlyAck 411, the transmitting station retransmits the packet 405b1 corresponding to the data packet 5 in the transmitting station MAC Layer. The transmitting station retransmits the packet 405b1 corresponding to the data packet 5, but not the packet 403b1 corresponding to the data packet 3 in the transmitting station MAC Layer, because the transmitting station knows that the expiration time for the data packet 3 has already past.

The receiving station records successfully received data packets in the receipt buffer 101. The receiving station MAC Layer monitors the timer in reference to the expiration times for the data packets and outputs the packet 401d corresponding to the data packet 1, the packet 402d corresponding to the data packet 2, the packet 404d corresponding to the data packet 4, the packet 405d corresponding to the data packet 5, the packet 406d corresponding to the data packet 6, the packet 407d corresponding to the data packet 7 to the upper layer before the expiration times for the packets pass.

As in the foregoing, the use of the transmitter device in accordance with the present embodiment in providing the transmitting station MAC Layer and the receiving station MAC Layer prevents the receiving station from keep waiting for an unreceived data packet which has, in terms of Sequence Number, been transmitted before successfully received data packets. This ensures that the receiving station outputs data packets to the upper layer before expiration times while following the Strict Order.

EMBODIMENT 2

The following will describe another embodiment of the present invention with reference to figures. Here, for convenience, features of the present embodiment that have similar functions as features of the foregoing embodiment, and that were mentioned in that embodiment are indicated by the same reference numerals and description thereof is omitted.

Figure 5:
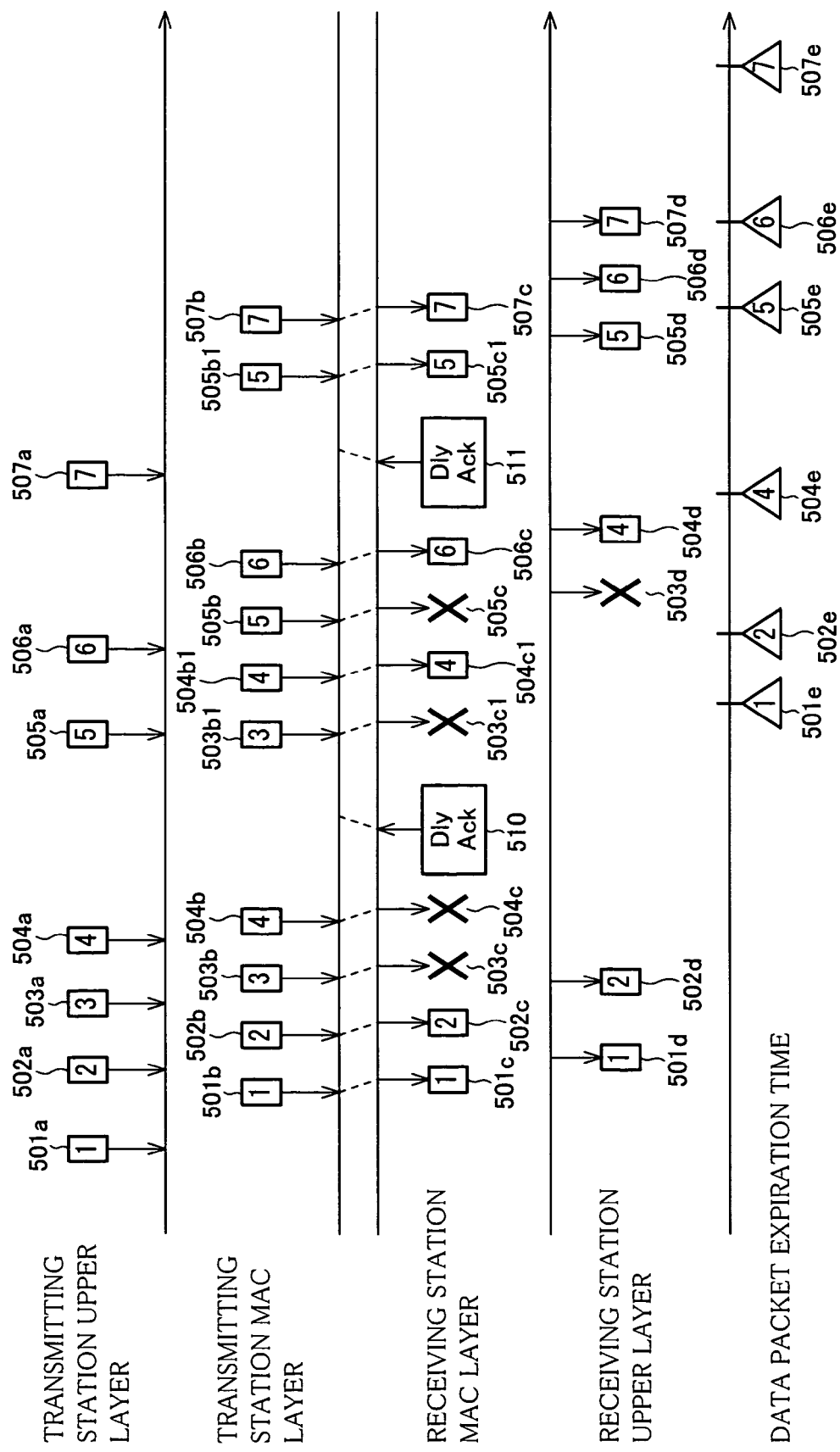
FIG. 5 shows another example of a data packet flow in a transmission by the transmitter device.

The present embodiment will present an example of data packets being output from the receiving station MAC Layer to the receiving station upper layer at different timings from those in embodiment 1. Refer to FIG. 5 for the packet flow example for the present embodiment.

The data flow from the transmitting station upper layer to the receiving station MAC Layer is identical to that described in embodiment 1 with reference to FIG. 4. In the present embodiment, however, the MAC Layer of the receiving station outputs a received data packet to the upper layer immediately after the receipt of the packet, so long as the Strict Order is being followed.

In the specific example in FIG. 4, upon receipt the packet 501c corresponding to the data packet 1, the packet 502c corresponding to the data packet 2, the packet 505c corresponding to the data packet 5, the packet 506c corresponding to the data packet 6, and the packet 507c corresponding to the data packet 7, it is confirmed that these packets are following the Strict Order. Immediately after the receipt, corresponding packets 501d, 502d, 505d, 506d, 507d are output to the upper layer.

Only if the Strict Order is not being followed, the successfully received data packets are stored in the receipt buffer 101. The timer is monitored, and so are the expiration times the data packets stored in the receipt buffer 101. Immediately before each expiration time passes, the associated data packet is output to the upper layer. In the FIG. 4 example, the data packet 4 (packet 504c1 in the receiving station MAC Layer) is not following the Strict Order.

The foregoing data flow control enables the data packet 4 to be output to the upper layer before the expiration time in the receiving station even when, for example, the data packet 3 has not been successfully received by the receiving station. Also, the control enables the receiving station to know more precisely that the data packet 3 has expired. Further, the upper layer can take more time in data processing, because the upper layer receives the data immediately after the data is received by the receiving station.

In other words, the transmitting station specifies an expiration time for each data packet, and the receiving station monitors the specified expiration time, so that the received data packets are sequentially (Strict Order) output to the upper layer without wasting the packets even when the receiving station receives the packets in a different sequence.

Note however that time stamping in absolute time in this manner requires a separate mechanism providing a common absolute time to the transmitting station and the receiving station. For example, the transmitting station may regularly transmits the current time so that the receiving station receives that information, and on the receipt synchronizes itself to the time given by the transmitting station.

EMBODIMENT 3

The following will describe a further embodiment of the present invention with reference to figures. Here, for convenience, features of the present embodiment that have similar functions as features of one or more of the foregoing embodiments, and that were mentioned in that embodiment are indicated by the same reference numerals and description thereof is omitted.

Embodiments 1, 2 described data packets with a time stamp field using absolute time. The present embodiment will describe data packets with an expiration-time-recording stamp field using relative time.

FIG. 6 shows, with absolute time on the horizontal axis, a time when a data packet is input from the transmitting station upper layer to the MAC Layer, a time when the data packet is transmitted for the first time from the transmitting station MAC Layer, a time when the data packet is transmitted for the second time from the transmitting station MAC Layer, and the expiration time for the data packet.

The transmitting station records a relative time 602 as a relative expiration time in a time stamp field of a data packet. The relative time 602 is calculated by subtracting the time when a first transmission of the data packet is started from the expiration time of the packet. If the first transmission fails, the packet is transmitted for the second time. In that case, a relative time 603 calculated by subtracting the time when a second transmission is started from the expiration time is recorded as a relative expiration time in the time stamp field. That is, the time stamp field is rewritten for every retransmission.

The receiving station recognizes and manages the sum of the relative expiration time recorded in the time stamp field and the time when the data packet is received as the expiration time for the data packet.

If a wireless transmission delay or an error correction delay is large, these delays may be subtracted in advance from the relative expiration time.

EMBODIMENT 4

The following will describe a further embodiment of the present invention with reference to figures. Here, for convenience, features of the present embodiment that have similar functions as features of one or more of the foregoing embodiments, and that were mentioned in that embodiment are indicated by the same reference numerals and description thereof is omitted.

Embodiments 1 through 3 described the addition of expiration time information in a data packet transmission from the transmitting station MAC Layer to the receiving station MAC Layer. The process is not limited to the MAC Layers, and may be implemented for any layer. For example, the use of expiration time information in a data packet transfer from the transmitting station upper layer (LLC layer) to the transmitting station MAC Layer or from the receiving station MAC Layer to the receiving station upper layer (LLC layer) determines the expiration time for the packet.

EMBODIMENT 5

Embodiments 1 through 3 described expiration time information of data packets in terms of a point in time. The information may be alternatively expressed using another variable. An example is the number of transmission cycles. When this is the case, for example, the Sequence Number of the transmission cycle and the number of transmission cycles indicating the expiration time are recorded in the time stamp field.

Alternatively, the expiration time information may be expressed using a number indicated by a counter. In this case, for example, the accumulated counter reading and a counter reading indicating an expiration time are recorded in the time stamp field. The counter may alternatively count the number of Superframes or TimeUnits.

As a further alternative, the expiration time information may be expressed using the number of retransmissions, in which case for example, the number of transmissions or retransmissions of the data packet, as well as the number of retransmissions indicating the expiration time, are recorded in the time stamp field.

The expiration time information may also be expressed using the number of packets, in which case for example, the total number of packets to be sent before the expiration time is recorded in the time stamp field.

In addition, the expiration time information may be expressed using the packet's Sequence Number, in which case for example, the Sequence Number of a packet which will expire is recorded in the time stamp field.

EMBODIMENT 6

The foregoing embodiments described typical cases where expiration times were calculated in the same manner for all data packets, thus specifying the same lifetime for all data packets. Alternatively, the lifetime, that is, the expiration time, may be determined variably from one data packet to another on the basis of an application data transfer rate, the precision of the timers in the transmitting station and the receiving station, the transmission buffer capacity of the transmitting station, and the receipt buffer capacity of the receiving station.

For example, when data quantity changes over a period of time as is the case with MPEG VBR (Variable Bit Rate), the time for which data can be held in the transmitting and receiving station buffers is variable. In other words, the lifetime varies depending on the available space in the transmitting and receiving station buffers. The expiration time is therefore set to an early value at a high bit rate and a late value at a low bit rate.

EMBODIMENT 7

The following will describe a further embodiment of the present invention with reference to figures. Here, for convenience, features of the present embodiment that have similar functions as features of one or more of the foregoing embodiments, and that were mentioned in that embodiment are indicated by the same reference numerals and description thereof is omitted.

The foregoing embodiments described examples where expiration time information is specified for input data packets. In the present embodiment, the transmitting station MAC Layer rearrange divide or merge input data from the upper layer into different packets for transmission. The following will describe an example as to how to specify expiration time information in relation to such a process.

Figure 8:
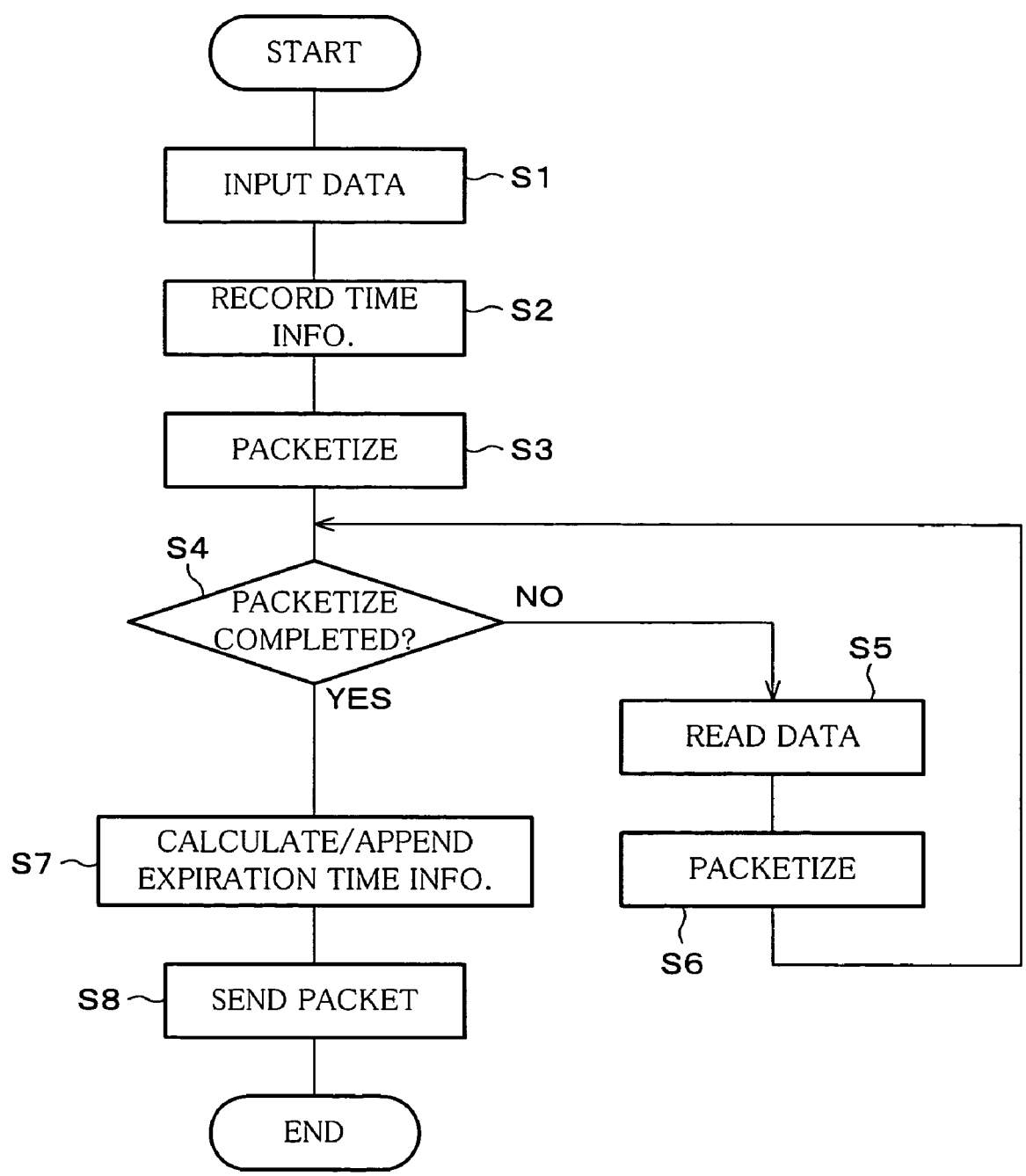
FIG. 8 is a flow chart illustrating the process of specify an expiration time.

FIG. 8 is a flow chart illustrating expiration time specifying procedures in accordance with the present embodiment. First, in step 1 (hereinafter, "S1), data to be transmitted is input from the transmitting station upper layer to the transmitting station MAC Layer. The transmitting station MAC Layer then records the input time from the transmitting station upper layer (S2) and packetizes the input data (S3).

In S4, it is determined whether all the input data has been packetized. If the packetization has not completed, (NO in S4), more data is read (S5), packetized (S6), and the process returns to S4. If the packetization has completed (YES in S4), an expiration time is calculated in the packetization based on the input time of the first input data, and the resultant value is recorded in the time stamp field of the generate data packet (S7). The data packet is then transmitted to the receiving station (S8), which ends the process.

Figure 7:
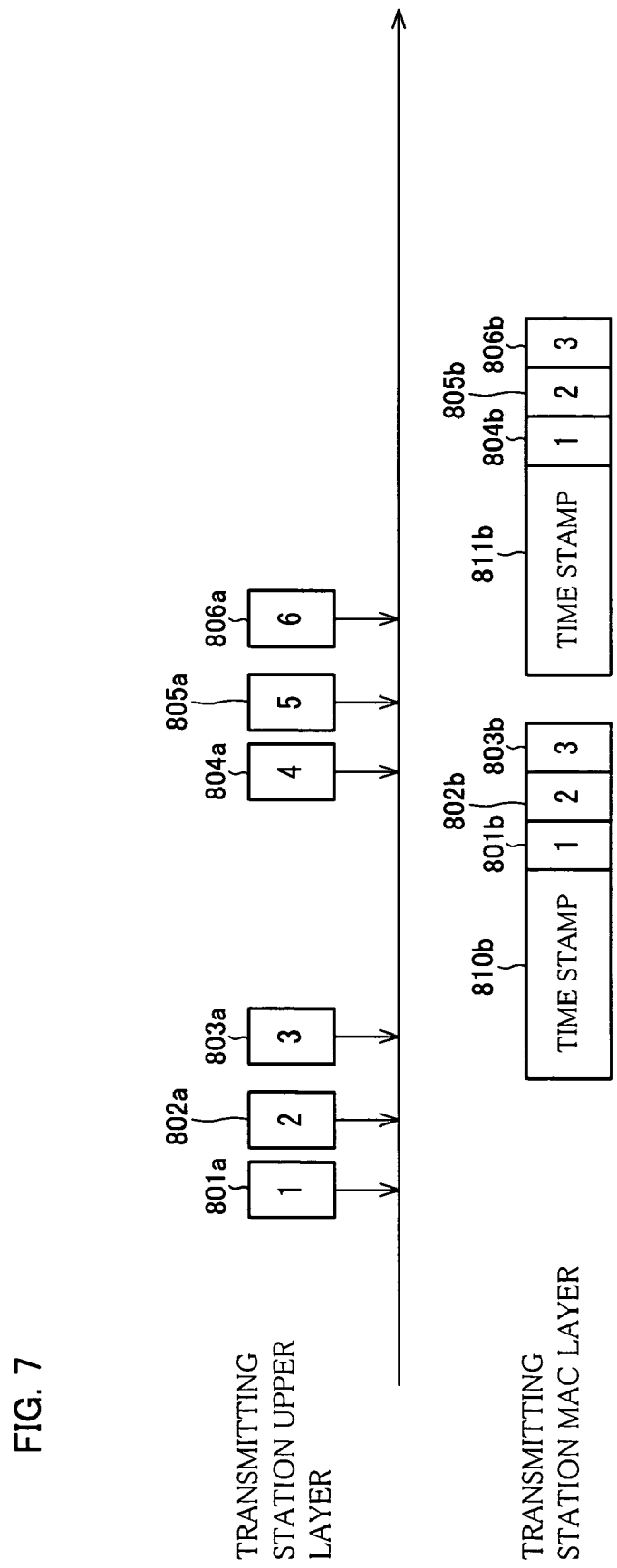
FIG. 7 shows, as an example, an expiration time information specifying method.

FIG. 7 illustrates an example as to how to specify expiration time information, whereby data sets, i.e., a data set 1 (801*a*), a data set 2 (802*a*), a data set 3 (803*a*), a data set 4 (804*a*), a data set 5 (805*a*), and a data set 6 (806*a*), are input from the transmitting station upper layer to the transmitting station MAC Layer. In the MAC Layer, the data sets are divided into groups each including a predetermined number of data sets as a packet.

More specifically, out of the input data sets from the upper layer, the data sets 1, 2, 3 form a single packet. An expiration time is calculated for the packet based on the input time of one of the data sets 1, 2, 3 which was the first to be input from the upper layer. The expiration time information is recorded in the time stamp field 810*b* of the packet containing the data sets 1, 2, 3 for transmission to the receiving station. The same approach applies to the data sets 4, 5, 6: a packet is generated with a time stamp field 811*b* in which is recorded an expiration time calculated based on the earliest input time of the data sets.

Now, reasons will be presented why the expiration time is calculated based on the time information of the data set which was input before the other sets. Supposing that the expiration time had been calculated based on the time information of a data set which was input after the other sets (for example, data set 3), the data sets 1, 2 would have already expired immediately after the expiration of the data set 3 in the receiving station. In other words, by calculating expiration times based on the time information of the time set which was the first to be input, can the expiration times for the data sets in the associated data packet managed suitably.

In the example, a single expiration time was specified for data sets making up a packet. Alternatively, data packet identity information sets and expiration time information sets may be specified for one packet. Identity information is used to explicitly depict which expiration time belongs to which data set. In the foregoing example, identity information sets and expiration times may be recorded for the respective packets 801a, 802a, 803a as the time stamp 810b; when this is the case, the expiration time and identity information set for each data set is managed together for use in discriminating between the expiration times of the data sets. The identity information and expiration time information associated with a data set may be appended at any position, which by no means limits the present invention. For example, the information may be appended to the head of each data set, the end of the packet, or the head of the packet as with 810b.

A transmitting station carrying out the foregoing process is realized by a similar arrangement to the one shown in FIG. 1. The foregoing described an example in which data sets input from the upper layer to the MAC Layer are merged into one packet. Alternatively, a data set input from the upper layer to the MAC Layer may be divided into multiple packets, which is also realized by a similar process similar to the foregoing one.

EMBODIMENT 8

The following will describe a further embodiment of the present invention with reference to figures. Here, for convenience, features of the present embodiment that have similar functions as features of one or more of the foregoing embodiments, and that were mentioned in that embodiment are indicated by the same reference numerals and description thereof is omitted.

Figure 10:
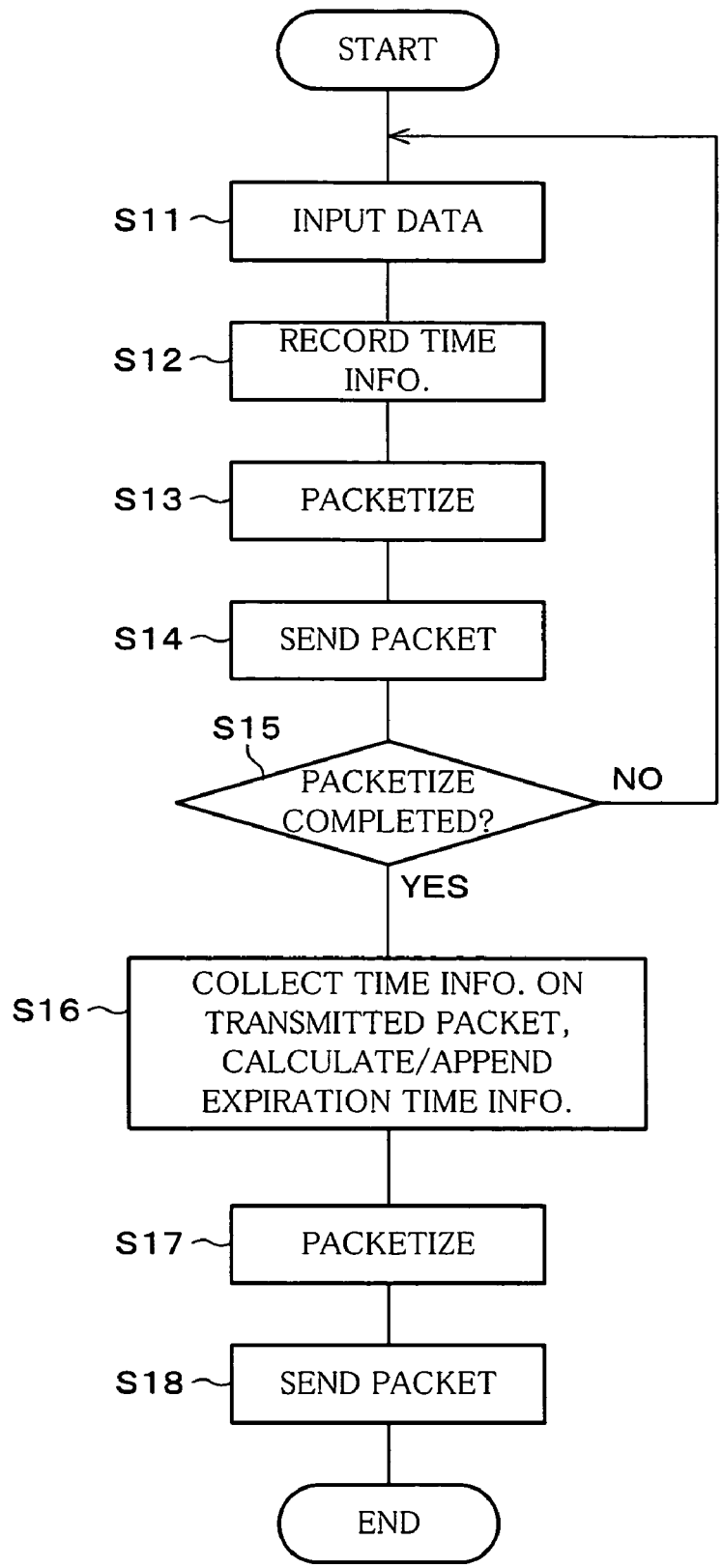
FIG. 10 is a flow chart illustrating the process of transmitting expiration time information.

The foregoing embodiments described the expiration time information of a data packet being recorded in that data packet for transmission. The expiration time information of a data packet is however not necessarily recorded in that data packet. The present embodiment notifies of an expiration time for any given data packet by (i) incorporating other data in a data packet and sending expiration time information for multiple data packets and/or (ii) transmitting a packet containing identity information identifying transmitted data packets and expiration time information corresponding to the data packets. In this case, these methods are realized by the transmitting station transmitting to the receiving station a packet containing expiration times for the data packets, a packet containing identity information of valid data packets, or conversely, a packet containing identity information of expired data packets FIG. 10 is a flow chart illustrating a transmission of expiration time information in accordance with the present embodiment. First, in S11, data to be transmitted is input from the transmitting station upper layer to the transmitting station MAC Layer. The transmitting station MAC Layer then records the input time from the transmitting station upper layer (S12) and packetizes the input data (S13).

In following S14, the generated data packets are transmitted. Note that no expiration time information is sent here. In S15, it is determined whether the transmitted data packets have reached a certain quantity. If there is a data packet yet to be transmitted completely (NO in S15), the process is repeated starting from S11.

If the transmitted data packets have reached a certain quantity (YES in S15), identity information of the one or more transmitted data packets is collected, and expiration times are calculated based on time information stored regarding corresponding data packets (S16). The identity information and the expiration time information are merged and packetized (S17), with the resulting packets being transmitted to the receiving station as an expiration time information packet (S18).

Figure 9:
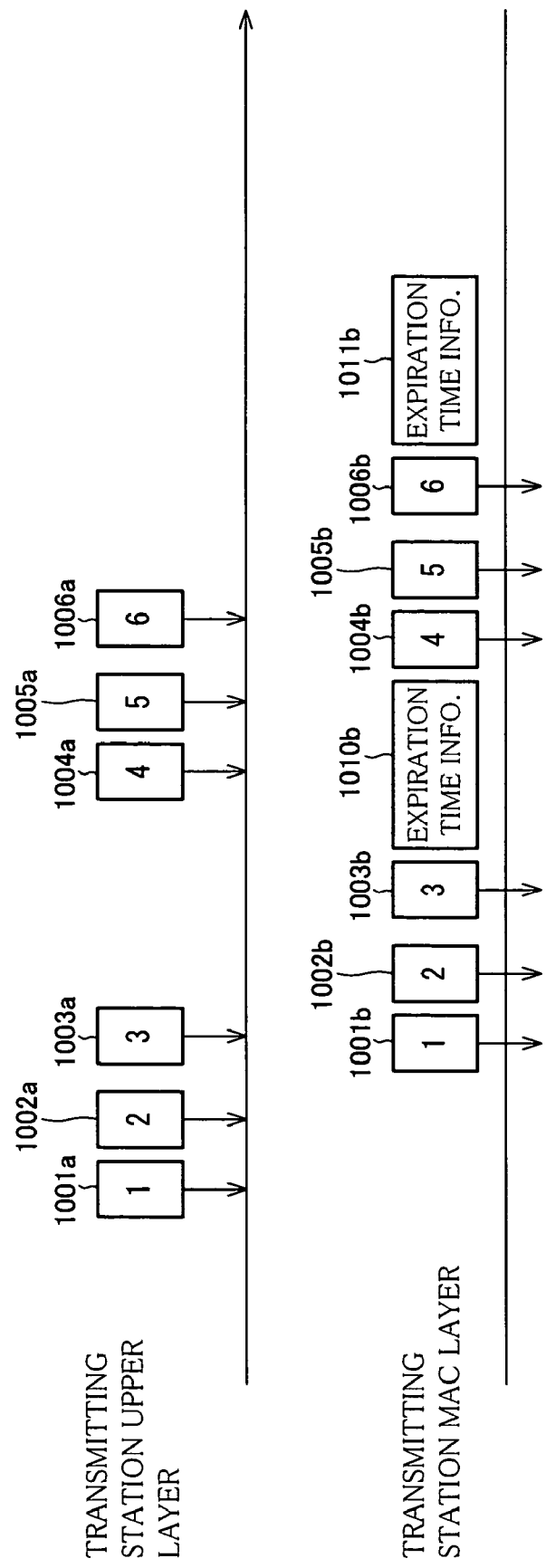
FIG. 9 shows another example of an expiration time information specifying method.

A packet containing expiration times for the transmitted data packets must be sent to the receiving station before the earliest expiration time is reached. FIG. 9 shows an example as to how to specify expiration time information, whereby data sets, i.e., a data set 1 (1001a), a data set 2 (1002a), a data set 3 (1003a), a data set 4 (1004a), a data set 5 (1005a), and a data set 6 (1006a) are input from the transmitting station upper layer to the transmitting station MAC Layer. Data packets are transmitted from the transmitting station MAC Layer to the receiving station without expiration time information being specified.

After the transmitted data packets (three data packets in this example) have reached a certain quantity, expiration time information calculated based on the transmission time information of one of the data packets transmitted so far which was transmitted at the earliest time is packetized together with the identity information of the packet. The generated packet is then transmitted to the receiving station as expiration time information packets 1010b, 1011b. The receiving station analyzes the expiration time information packets to find expiration times for the data packets.

In the foregoing example, a single piece of expiration time information was appended for multiple expiration time information packets. Alternatively, packet identity information and expiration time information for multiple packets may be contained in an expiration time information packet. For example, in the foregoing example, 1010b may contain identity information of packets 1001, 1002, 1003 and expiration times for the packets.

A transmitting station carrying out the foregoing process is realized by a similar arrangement to the one shown in FIG. 1. The quantity of the packet may be set to a certain value in a communications system. Alternatively, the transmitting station keep transmitting data packets until the receiving station requests expiration time information, at which time the transmitting station transmits expiration time information for the data packet transmitted up to that time.

EMBODIMENT 9

In the foregoing embodiments, expiration times for data packets were managed by the transmitting station. This is not necessary. In the present embodiment, the expiration times are managed by the receiving station. In other words, for example, when the receiving station has determined that a data packet is no longer valid, the receiving station sends the identity information of the invalid data packet to the transmitting station to notify that the data packet has expired. When this is the case, the transmitting station stops retransmission of the data packet reportedly no longer valid and clears the data stored in the transmission buffer 104 in the transmitting station.

Figure 12:
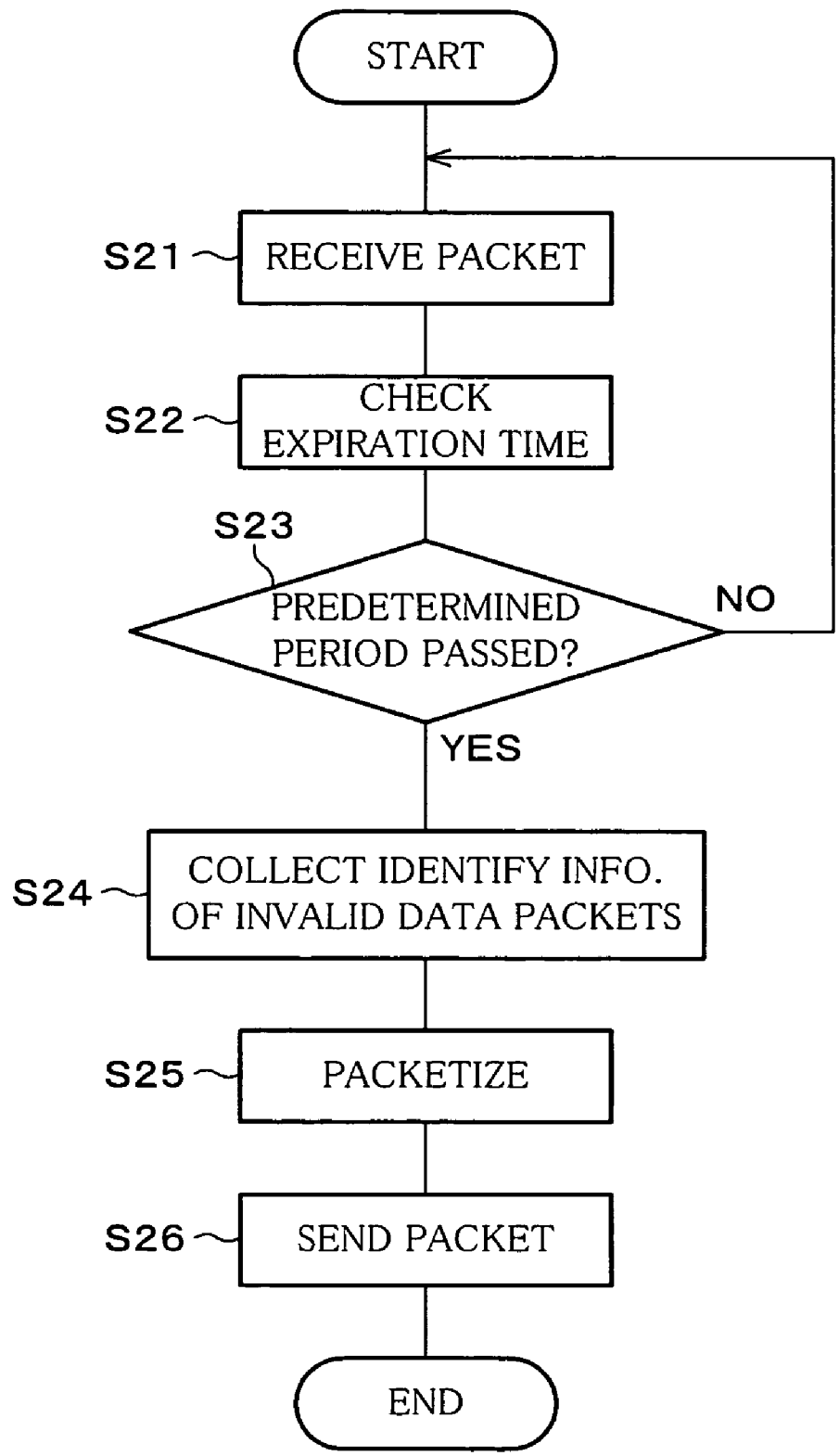
FIG. 12 is a flow chart illustrating a process at the receiving station when the expiration time information packet is transmitted from the receiving station to the transmitting station.
Figure 13:
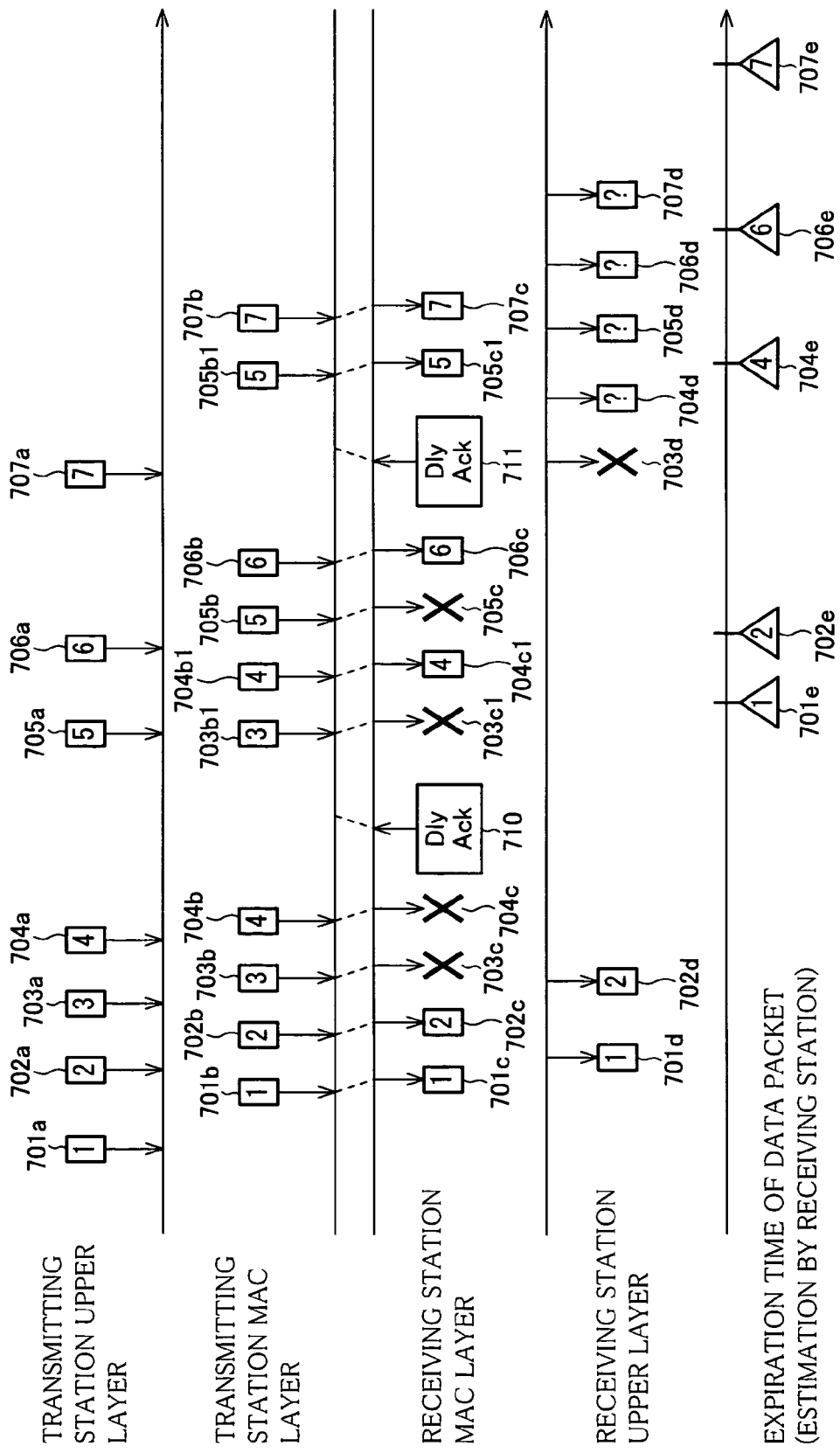
FIG. 13 shows, as an example, a conventional data packet flow.

A process in the receiving station in accordance with the present embodiment will be described in reference to the flow chart in FIG. 12. First, when a data packet containing identity information is received from the transmitting station in S21, expiration times are calculated based on the receipt time, and expiration times for the data packets are managed. The data packets in the receipt buffer 101 are checked for validity as necessary (S22). If a data packet is determined to have expired, the data packet is output to the receiving station upper layer. Thereafter, it is determined in S23 whether S21 and S22 have been carried out for a predetermined period of time. If the predetermined period has not elapsed yet, S21 and S22 are repeated.

On the other hand, if the answer is YES in S23, in other words, if it is determined in S23 that S21 and S22 have been carried out for a predetermined period, the identity information of the data packet which is no longer valid and output to the receiving station upper layer is collected in S24. Thereafter, the collected identity information is packetized (S25) and transmitted to the transmitting station as an expiration time information packet (S26).

Upon receipt of the expiration time information packet, the transmitting station discards the data packet identified by the identity information contained in that information packet from the transmission buffer 104.

Figure 11:
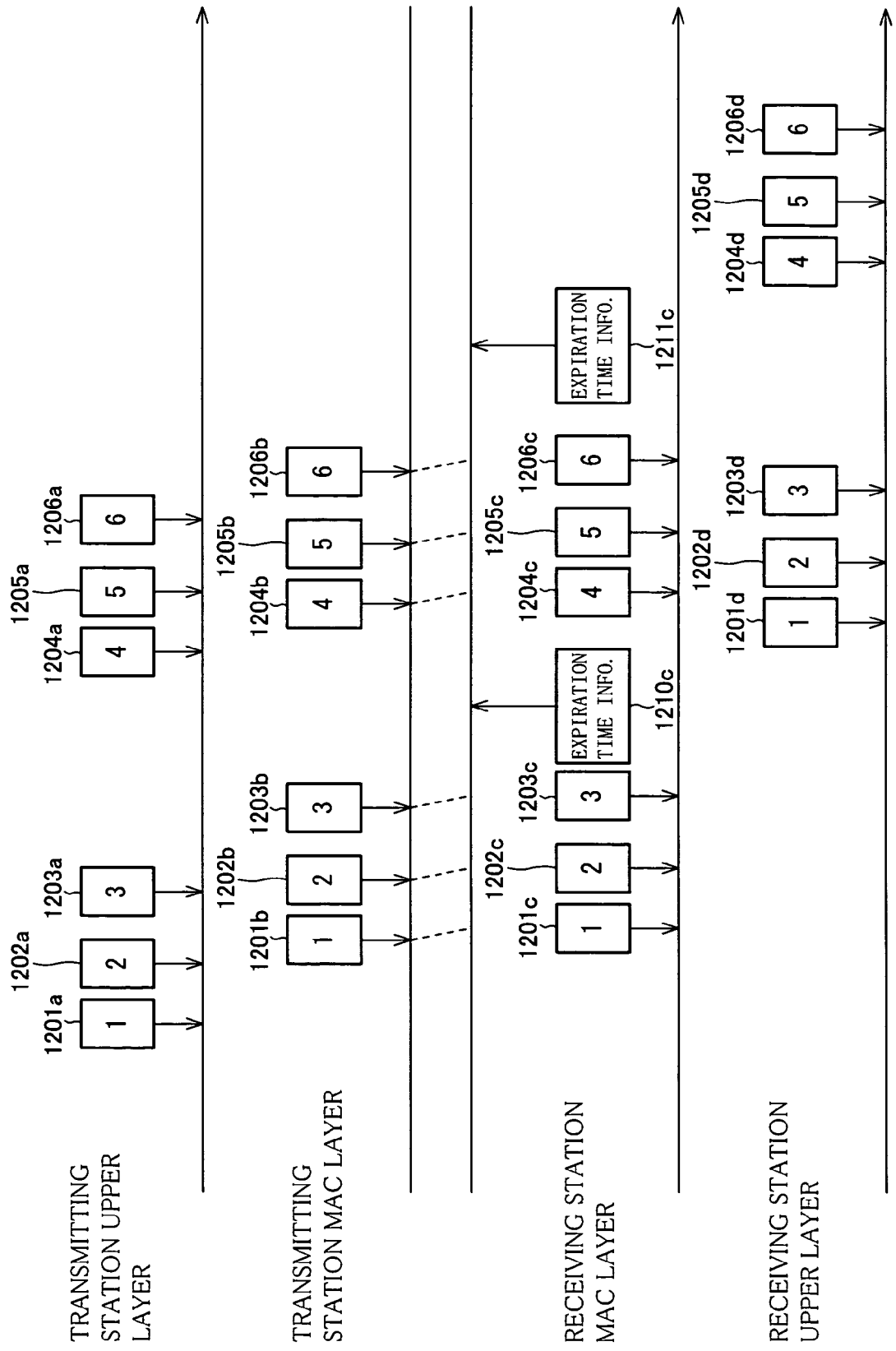
FIG. 11 shows, as an example, a data packet flow when an expiration time information packet is transmitted from a receiving station to a transmitting station.

Next, an example of the data packet flow in accordance with the present embodiment will be described with reference to FIG. 11. The data packets 1 (1201a), 2 (1202a), 3 (1203a) generated in the transmitting station upper layer are transmitted from the transmitting station MAC Layer to the receiving station as packets 1201b, 1202b, 1203b. The receiving station receives them as packets 1201c, 1202c, 1203c.

The receiving station transmits, to the transmitting station, information on the data packet which is no longer valid and output to the upper layer in the receiving station. In the figure, the information is indicated as an expiration time information packet 1210c. The expiration time information packet 1210c contains information that no data packet has expired, because none of data packets is yet to expire and be output to the upper layer when the expiration time information packet 1210c is transmitted.

Similarly, the data sets 4, 5, 6 are received by the receiving station MAC Layer as packets 1204c, 1205c, 1206c. When the data sets 4, 5, 6 have expired, the data sets are output to the receiving station upper layer as packets 1204d, 1205d, 1206d. When the expiration time information packet 1211c is transmitted to the transmitting station, the data packets 1, 2, 3 have already expired and output to the receiving station upper layer. Therefore, the expiration time information packet 1211c containing identity information of the data packets 1, 2, 3 is transmitted to the transmitting station.

Upon receipt of the expiration time information packet from the receiving station, the transmitting station recognizes that the data packet identified by the identity information contained in the expiration time information packet has expired and clears the corresponding data packet from the transmission buffer 104.

The foregoing described an example whereby the receiving station transmits expiration time information to the transmitting station for every three data packets. The expiration time information may be transmitted at any interval. For example, the expiration time information may be transmitted: at a certain cycle based on the predetermined number of data packets, Superframes, or TimeUnits; when the transmitting station has requested a transmission of the expiration time information; or when the receipt buffer 101 in the receiving station has become full.

EMBODIMENT 10

In embodiment 9, the validity of a data packet received by the receiving station from the transmitting station was determined through comparison of the expiration time information of the data packet to a time. The receiving station however may use the various approaches to expiration time management as described in embodiment 5 to determine validity and send expiration time information to the transmitting station.

The receiving station may manage expiration time information of rearranged data packets as described in embodiment 7, in which case the receiving station determines the validity of the rearranged data packets as described as an example in embodiment 7.

The expiration time information may be included in a DELAYED-ACK transmitted from the receiving station to the transmitting station.

Expiration times were calculated and appended by the transmitting station in the foregoing examples. Expiration times may be calculated by the receiving station, in which case information on devices, etc. needs to be exchanged in advance between the transmitting station and the receiving station.

Identity information may be created so that, for example, the information identifies each invalid data packet, identifies a single packet while giving an indication that all the preceding packets are invalid, or identifies a range of invalid data packets.

The aforementioned expiration time calculation method examples and identity information designation method examples may be used in combination.

The expiration time information specifying methods described in the embodiments may be implemented in any given combination.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The packet communications method, communications system, communications device, and communications program in accordance with the present invention can be used in a network of communications devices carrying out packet communications. Examples include a communications network involving a wireless LAN. An application example is a communications network for video streaming.

The invention claimed is:

1. A packet communications method, comprising the steps of:
transmitting a packet containing expiration time information for the packet or for a body of the packet either in the body or in a header of the packet, wherein
the expiration time information is specified according to a period of time from inputting of the packet from an upper layer of the transmitting station to outputting of the packet to an upper layer of the receiving station; and
receiving the packet as a received packet in the receiving station, wherein
if a transmission sequence is not being followed, the received packet is held up to a point in time immediately before an expiration time for the received packet; and
if, at the point in time, there is a packet yet to be received which precedes the received packet in the transmission sequence, a receipt of the yet-to-be-received packet is given up, and a soon-to-expire packet is output to the upper layer of the receiving station.

2. A packet communications method, the method comprising the steps of:

transmitting a packet, wherein either a header or a body of the packet to be transmitted contains expiration time information for another packet and/or expiration time information for a body of the other packet; and receiving the packet as a received packet, wherein if a transmission sequence is not being followed, the received packet is held up to a point in time immediately before an expiration time for the received packet; and if, at the point in time, there is a packet yet to be received which precedes the received packet in the transmission sequence, a receipt of the yet-to-be-received packet is given up, and a soon-to-expire packet is output to an upper layer.

3. A packet communications method, comprising the steps of:

when receiving a packet containing expiration time information for the packet or for a body of the packet either in the body or in a header of the packet, determining an expiration time for the packet based on the expiration time information, wherein the received packet is buffered up to a point in time immediately before the expiration time for the packet, so that data in the packet is output to an upper layer before the expiration time for the packet, wherein if a transmission sequence is not being followed, the received packet is held up to a point in time immediately before an expiration time for the packet; and if, at the point in time, there is a packet yet to be received which precedes the received packet in the transmission sequence, the receipt of the yet-to-be-received packet is given up, and the soon-to-expire packet is output to an upper layer.

4. A packet communications method, comprising the steps of:

when receiving a packet containing expiration time information for the packet or for a body of the packet either in the body or in a header of the packet, determining an expiration time for the packet based on the expiration time information, wherein data in the packet is output to an upper layer immediately after the packet is received, if the packet is following a transmission sequence, wherein if a transmission sequence is not being followed, the received packet is held up to a point in time immediately before an expiration time for the packet; and if, at the point in time, there is a packet yet to be received which precedes the received packet in the transmission sequence, the receipt of the yet-to-be-received packet is given up, and the soon-to-expire packet is output to an upper layer.

5. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time appending means for appending expiration time information on the expiration time to the packet; and the receiving station including:

expiration time determining means for determining expiration time for the packet on the basis of the expiration time information in a received packet, wherein in the receiving station:

the received packet is buffered up to a point in time immediately before an expiration time for the packet, so that data in the packet is output to an upper layer before the expiration time for the packet, wherein if a transmission sequence is not being followed, the received packet is held up to a point in time immediately before an expiration time for the packet; and if, at the point in time, there is a packet yet to be received which precedes the received packet in the transmission sequence, the receipt of the yet-to-be-received packet is given up, and the soon-to-expire packet is output to an upper layer.

6. The communications system as set forth in claim 5, wherein in the transmitting station:

the packet generating means converts one or more sets of data to one packet; and the expiration time appending means appends to the packet the expiration time information and identity information for one of the sets of data corresponding to the expiration time information, and in the receiving station:

the expiration time determining means determines expiration time for the data in the packet on the basis of the expiration time information and the identity information in a received packet.

7. A communications system including a transmitting station transmitting packets and a receiving station receiving packets, said system comprising: the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station:

the received packet is buffered up to a point in time immediately before an expiration time for the packet, so that data in the packet is output to an upper layer before the expiration time for the packet, wherein if a transmission sequence is not being followed, the received packet is held up to a point in time immediately before an expiration time for the packet; and if, at the point in time, there is a packet yet to be received which precedes the received packet in the transmission sequence, the receipt of the yet-to-be-received packet is given up, and the soon-to-expire packet is output to an upper layer.

8. The communications system as set forth in any one of claims 5 and 7, wherein in the transmitting station, the expiration time information is defined in terms of absolute time.

9. The communications system as set forth in any one of claims 5 and 7, wherein
in the transmitting station, the expiration time information is defined in terms of relative time starting at a time when a packet is transmitted.

10. The communications system as set forth in any one of claims 5 and 7, wherein
in the transmitting station, the expiration time information defined in terms of a packet retransmission count.

11. The communications system as set forth in any one of claims 5 and 7, wherein
in the transmitting station, the expiration time information is defined in terms of a predetermined unit count.

12. The communications system as set forth in any one of claims 5 and 7, wherein
in the transmitting station, the expiration time information is defined in terms of Sequence Number.

13. The communications system as set forth in any one of claims 5 and 7, wherein
in the receiving station,
data in the packet is output to an upper layer immediately after the packet is received, if the received packet is following a transmission sequence.

14. The communications system as set forth in any one of claims 5 and 7, said system being realized according to the IEEE 802.11 standard.

15. A storage medium containing a communications program causing a computer to implement a process performed by the transmitting station or the receiving station of the communications system as set forth in any one of claims 5 and 7.

16. The communications system as set forth in either one of claims 5 and 7, wherein
the expiration time information is specified according to a period of time from inputting of the packet from an upper layer of the transmitting station to outputting of the packet to an upper layer of the receiving station.

17. A communications device connected to a communications system, said device comprising:
a transmission buffer buffering incoming transmitted data from an upper layer;
a timer managing time;
a time stamp generator generating an expiration time for a packet to be transmitted in the form of a time stamp;
a packet processor packetizing the data to be transmitted and the time stamp; and
a protocol controller transmitting the packet generated by the packet processor to a lower layer, and
a receiving unit receiving the packet as a received packet, wherein
if a transmission sequence is not being followed, the received packet is held up to a point in time immediately before an expiration time for the received packet; and
if, at the point in time, there is a packet yet to be received which precedes the received packet in the transmission sequence, a receipt of the yet-to-be-received packet is given up, and a soon-to-expire packet is output to an upper layer.

18. A communications device connected to a communications system, said device comprising:
a protocol controller receiving a packet from an external communications device;
a packet processor dividing the received packet into received data and a time stamp and associating the data and the stamp;
a receipt buffer buffering the received data; and
a time stamp analyzer analyzing the time stamp so as to instruct for an output of the received data from the receipt buffer to an upper layer when an output time for the received data corresponding to the time stamp has come, wherein
the output time is equal to a time of input from the upper layer in addition to a lifetime of the data (Time of Input from Upper Layer + Lifetime).

19. The communications device as set forth in any one of claims 17 and 18, said device being realized by a MAC Layer.

20. A packet communications method, comprising the steps of:
when receiving a packet containing expiration time information for the packet or for a body of the packet either in the body or in a header of the packet, determining an expiration time for the packet based on the expiration time information, wherein
the expiration time information is specified according to a period of time from inputting of the packet from an upper layer of the transmitting station to outputting of the packet to an upper layer of the receiving station,
if a transmission sequence is not being followed, the packet is held up to a point in time immediately before an expiration time for the packet; and
if, at the point in time, there is a packet yet to be received which precedes the packet in the transmission sequence, a receipt of the yet-to-be-received packet is given up, and a soon-to-expire packet is output to the upper layer of the receiving station.

21. The packet communications method as set forth in either one of claims 1, 3, 4, and 20, wherein
either the header or body of the packet to be transmitted contains expiration time information for that packet and/or expiration time information for a body of the packet.

22. A communications system including a transmitting station transmitting packets and a receiving station receiving packets, said system comprising:
the transmitting station including:
packet generator for converting data to be transmitted to a predetermined packet;
expiration time calculator for calculating an expiration time for at least part of data in the packet; and
expiration time appending unit for appending expiration time information on the expiration time to the packet; and
the receiving station including:
expiration time determining unit for determining expiration time for the packet on the basis of the expiration time information in a received packet, wherein
in the receiving station,
the received packet is buffered up to a point in time immediately before an expiration time for the packet, so that data in the packet is output to an upper layer before the expiration time for the packet, wherein
if a transmission sequence is not being followed, the received packet is held up to a point in time immediately before an expiration time for the packet; and
if, at the point in time, there is a packet yet to be received which precedes the received packet in the transmission sequence, the receipt of the yet-to-be-received packet is given up, and the soon-to-expire packet is output to an upper layer.

23. A communications system including a transmitting station transmitting packets and a receiving station receiving packets, said system comprising:

the transmitting station including:
packet generator for converting data to be transmitted to a predetermined packet;
expiration time calculator for calculating an expiration time for at least part of data in the packet; and
expiration time packet generator for generating an expiration time information packet containing expiration time information on the expiration time and identity information for data corresponding to the expiration time information; and
the receiving station including:
expiration time determining unit for determining expiration time for a received packet on the basis of the expiration time information in a received expiration time information packet,
wherein
in the receiving station,
the received packet is buffered up to a point in time immediately before an expiration time for the packet, so that data in the packet is output to an upper layer before the expiration time for the packet, wherein
if a transmission sequence is not being followed, the received packet is held up to a point in time immediately before an expiration time for the packet; and
if, at the point in time, there is a packet yet to be received which precedes the received packet in the transmission sequence, the receipt of the yet-to-be-received packet is given up, and the soon-to-expire packet is output to an upper layer.

24. A communications system comprising:
a transmitting station including:
packet generator for converting data to be transmitted to a predetermined packet;
expiration time calculator for calculating an expiration time for at least part of data in the predetermined packet; and
expiration time appending unit for appending expiration time information on the expiration time to the predetermined packet, wherein
either a header or a body of a packet to be transmitted contains expiration time information for another packet and/or expiration time information for a body of the other packet, wherein the predetermined packet is received as a received packet in a receiving station:
if a transmission sequence is not being followed, the received packet is held up to a point in time immediately before an expiration time for the received packet; and
if, at the point in time, there is a packet yet to be received which precedes the received packet in the transmission sequence, a receipt of the yet-to-be-received packet is given up, and a soon-to-expire packet is output to an upper layer.

25. A communications system comprising:
a receiving station including:
expiration time determining unit for determining expiration time for the packet on the basis of the expiration time information in a received packet, wherein
in the receiving station,
the received packet is buffered up to a point in time immediately before an expiration time for the packet, so that data in the packet is output to an upper layer before the expiration time for the packet, wherein
if a transmission sequence is not being followed, the received packet is held up to a point in time immediately before an expiration time for the packet; and
if, at the point in time, there is a packet yet to be received which precedes the received packet in the transmission sequence, the receipt of the yet-to-be-received packet is given up, and the soon-to-expire packet is output to an upper layer.

26. A communications system comprising:
a transmitting station including:
packet generator for converting data to be transmitted to a predetermined packet;
expiration time calculator for calculating an expiration time for at least part of data in the packet; and
expiration time packet generator for generating an expiration time information packet containing expiration time information on the expiration time and identity information for data corresponding to the expiration time information, wherein
either a header or a body of a packet to be transmitted contains expiration time information for another packet and/or expiration time information for a body of the other packet, wherein the packet is received as a received packet in a receiving station:
if a transmission sequence is not being followed, the received packet is held up to a point in time immediately before an expiration time for the received packet; and
if, at the point in time, there is a packet yet to be received which precedes the received packet in the transmission sequence, a receipt of the yet-to-be-received packet is given up, and a soon-to-expire packet is output to an upper layer.

27. A communications system comprising:
a receiving station including:
expiration time determining unit for determining expiration time for a received packet on the basis of the expiration time information in a received expiration time information packet, wherein
in the receiving station,
the received packet is buffered up to a point in time immediately before an expiration time for the packet, so that data in the packet is output to an upper layer before the expiration time for the packet, wherein
if a transmission sequence is not being followed, the received packet is held up to a point in time immediately before an expiration time for the packet; and
if, at the point in time, there is a packet yet to be received which precedes the received packet in the transmission sequence, the receipt of the yet-to-be-received packet is given up, and the soon-to-expire packet is output to an upper layer.

28. A communications system including a transmitting station transmitting packets and a receiving station receiving packets, said system comprising:
the transmitting station including:
packet generating means for converting data to be transmitted to a predetermined packet;
expiration time calculating means for calculating an expiration time for at least part of data in the packet; and
expiration time appending means for appending expiration time information on the expiration time to the packet; and
the receiving station including:
expiration time determining means for determining expiration time for the packet on the basis of the expiration time information in a received packet, wherein
in the receiving station,
data in the packet is output to an upper layer immediately after the packet is received, if the received packet is following a transmission sequence, wherein if a transmission sequence is not being followed, the received packet is held up to a point in time immediately before an expiration time for the packet; and if, at the point in time, there is a packet yet to be received which precedes the received packet in the transmission sequence, the receipt of the yet-to-be-received packet is given up, and the soon-to-expire packet is output to an upper layer.

29. The communications system as set forth in claim 28, wherein in the transmitting station:

the packet generating means converts one or more sets of data to one packet; and the expiration time appending means appends to the packet the expiration time information and identity information for one of the sets of data corresponding to the expiration time information, and in the receiving station:

the expiration time determining means determines expiration time for the data in the packet on the basis of the expiration time information and the identity information in a received packet.

30. The communications system as set forth in claim 28, wherein in the transmitting station, the expiration time information is defined in terms of absolute time.

31. The communications system as set forth in claim 28, wherein in the transmitting station, the expiration time information is defined in terms of relative time starting at a time when a packet is transmitted.

32. The communications system as set forth in claim 28, wherein in the transmitting station, the expiration time information defined in terms of a packet retransmission count.

33. The communications system as set forth in claim 28, wherein in the transmitting station, the expiration time information is defined in terms of a predetermined unit count.

34. The communications system as set forth in claim 28, wherein in the transmitting station, the expiration time information is defined in terms of Sequence Number.

35. The communications system as set forth in claim 28, wherein in the receiving station, the received packet is buffered up to a point in time immediately before an expiration time for the packet, so that data in the packet is output to an upper layer before the expiration time for the packet.

36. The communications system as set forth in claim 28, said system being realized according to the IEEE 802.11 standard.

37. A storage medium containing a communications program causing a computer to implement a process performed by the transmitting station or the receiving station of the communications system as set forth in claim 28.

38. The communications system as set forth in claim 28, wherein the expiration time information is specified according to a period of time from inputting of the packet from an upper layer of the transmitting station to outputting of the packet to an upper layer of the receiving station.

39. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station, data in the packet is output to an upper layer immediately after the packet is received, if the received packet is following a transmission sequence, wherein if a transmission sequence is not being followed, the received packet is held up to a point in time immediately before an expiration time for the packet; and if, at the point in time, there is a packet yet to be received which precedes the received packet in the transmission sequence, the receipt of the yet-to-be-received packet is given up, and the soon-to-expire packet is output to an upper layer.

40. The communications system as set forth in claim 39, wherein in the transmitting station, the expiration time information is defined in terms of absolute time.

41. The communications system as set forth in claim 39, wherein in the transmitting station, the expiration time information is defined in terms of relative time starting at a time when a packet is transmitted.

42. The communications system as set forth in claim 39, wherein in the transmitting station, the expiration time information defined in terms of a packet retransmission count.

43. The communications system as set forth in claim 39, wherein in the transmitting station, the expiration time information is defined in terms of a predetermined unit count.

44. The communications system as set forth in claim 39, wherein in the transmitting station, the expiration time information is defined in terms of Sequence Number.

45. The communications system as set forth in claim 39, wherein in the receiving station, the received packet is buffered up to a point in time immediately before an expiration time for the packet, so that data in the packet is output to an upper layer before the expiration time for the packet.

46. The communications system as set forth in claim 39, said system being realized according to the IEEE 802.11 standard.

47. A storage medium containing a communications program causing a computer to implement a process performed by the transmitting station or the receiving station of the communications system as set forth in claim 39.

48. The communications system as set forth in claim 39, wherein the expiration time information is specified according to a period of time from inputting of the packet from an upper layer of the transmitting station to outputting of the packet to an upper layer of the receiving station.

49. A communications system including a transmitting station transmitting packets and a receiving station receiving packets, said system comprising:
the transmitting station including:
packet generator for converting data to be transmitted to a predetermined packet;
expiration time calculator for calculating an expiration time for at least part of data in the packet; and
expiration time appending unit for appending expiration time information on the expiration time to the packet; and
the receiving station including:
expiration time determining unit for determining expiration time for the packet on the basis of the expiration time information in a received packet wherein
in the receiving station,
data in the packet is output to an upper layer immediately after the packet is received, if the received packet is following a transmission sequence, wherein
if a transmission sequence is not being followed, the received packet is held up to a point in time immediately before an expiration time for the packet; and
if, at the point in time, there is a packet yet to be received which precedes the received packet in the transmission sequence, the receipt of the yet-to-be-received packet is given up, and the soon-to-expire packet is output to an upper layer.

50. A communications system including a transmitting station transmitting packets and a receiving station receiving packets, said system comprising:
the transmitting station including:
packet generator for converting data to be transmitted to a predetermined packet;
expiration time calculator for calculating an expiration time for at least part of data in the packet; and
expiration time packet generator for generating an expiration time information packet containing expiration time information on the expiration time and identity information for data corresponding to the expiration time information; and
the receiving station including:
expiration time determining unit for determining expiration time for a received packet on the basis of the expiration time information in a received expiration time information packet wherein
in the receiving station,
data in the packet is output to an upper layer immediately after the packet is received, if the received packet is following a transmission sequence, wherein
if a transmission sequence is not being followed, the received packet is held up to a point in time immediately before an expiration time for the packet; and
if, at the point in time, there is a packet yet to be received which precedes the received packet in the transmission sequence, the receipt of the yet-to-be-received packet is given up, and the soon-to-expire packet is output to an upper layer.

51. A communications system comprising:
a receiving station including:
expiration time determining unit for determining expiration time for the packet on the basis of the expiration time information in a received packet wherein
in the receiving station,
data in the packet is output to an upper layer immediately after the packet is received, if the received packet is following a transmission sequence, wherein
if a transmission sequence is not being followed, the received packet is held up to a point in time immediately before an expiration time for the packet; and
if, at the point in time, there is a packet yet to be received which precedes the received packet in the transmission sequence, the receipt of the yet-to-be-received packet is given up, and the soon-to-expire packet is output to an upper layer.

52. A communications system comprising:
a receiving station including:
expiration time determining unit for determining expiration time for a received packet on the basis of the expiration time information in a received expiration time information packet,
wherein
in the receiving station,
data in the packet is output to an upper layer immediately after the packet is received, if the received packet is following a transmission sequence, wherein
if a transmission sequence is not being followed, the received packet is held up to a point in time immediately before an expiration time for the packet; and
if, at the point in time, there is a packet yet to be received which precedes the received packet in the transmission sequence, the receipt of the yet-to-be-received packet is given up, and the soon-to-expire packet is output to an upper layer.

53. A communications system including a transmitting station transmitting packets and a receiving station receiving packets, said system comprising:
The transmitting station including:
packet generating means for converting data to be transmitted to a predetermined packet;
expiration time calculating means for calculating an expiration time for at least part of data in the packet; and
expiration time appending means for appending expiration time information on the expiration time to the packet; and
the receiving station including:
expiration time determining means for determining expiration time for the packet on the basis of the expiration time information in a received packet, wherein in the receiving station:
the received packet is buffered up to a point in time immediately before an expiration time for the packet, so that data in the packet is output to an upper layer before the expiration time for the packet, wherein:
the transmitting station further includes a transmission buffer buffering incoming transmitted data and a timer managing time; and
the receiving station further includes a receipt buffer buffering received data in the received packet and a timer managing time,
wherein the expiration time information is defined in terms of absolute time which is changed on the basis of at least any one of a capacity of the transmission buffer, a capacity of the receipt buffer, accuracy of the timers of the transmitting station and the receiving station, and a type of the transmitted data.

54. A communications system including a transmitting station transmitting packets and a receiving station receiving packets, said system comprising:

the transmitting station including:
packet generating means for converting data to be transmitted to a predetermined packet;
expiration time calculating means for calculating an expiration time for at least part of data in the packet; and
expiration time appending means for appending expiration time information on the expiration time to the packet; and
the receiving station including:
expiration time determining means for determining expiration time for the packet on the basis of the expiration time information in a received packet, wherein in the receiving station:
the received packet is buffered up to a point in time immediately before an expiration time for the packet, so that data in the packet is output to an upper layer before the expiration time for the packet, wherein:
the transmitting station further includes a transmission buffer buffering incoming transmitted data and a timer managing time; and
the receiving station further includes a receipt buffer buffering received data in the received packet and a timer managing time,
wherein the expiration time information is defined in terms of relative time starting at a time when a packet is transmitted which is changed on the basis of at least any one of a capacity of the transmission buffer, a capacity of the receipt buffer, accuracy of the timers of the transmitting station and the receiving station, and a type of the transmitted data.

55. A communications system including a transmitting station transmitting packets and a receiving station receiving packets, said system comprising:
the transmitting station including:
packet generating means for converting data to be transmitted to a predetermined packet;
expiration time calculating means for calculating an expiration time for at least part of data in the packet; and
expiration time appending means for appending expiration time information on the expiration time to the packet; and
the receiving station including:
expiration time determining means for determining expiration time for the packet on the basis of the expiration time information in a received packet, wherein in the receiving station:
the received packet is buffered up to a point in time immediately before an expiration time for the packet, so that data in the packet is output to an upper layer before the expiration time for the packet, wherein:
the transmitting station further includes a transmission buffer buffering incoming transmitted data and a timer managing time; and
the receiving station further includes a receipt buffer buffering received data in the received packet and a timer managing time,
wherein the expiration time information is defined in terms of a packet retransmission count which is changed on the basis of at least any one of a capacity of the transmission buffer, a capacity of the receipt buffer, accuracy of the timers of the transmitting station and the receiving station, and a type of the transmitted data.

56. A communications system including a transmitting station transmitting packets and a receiving station receiving packets, said system comprising:
the transmitting station including:
packet generating means for converting data to be transmitted to a predetermined packet;
expiration time calculating means for calculating an expiration time for at least part of data in the packet; and
expiration time appending means for appending expiration time information on the expiration time to the packet; and
the receiving station including:
expiration time determining means for determining expiration time for the packet on the basis of the expiration time information in a received packet, wherein in the receiving station:
the received packet is buffered up to a point in time immediately before an expiration time for the packet, so that data in the packet is output to an upper layer before the expiration time for the packet, wherein:
the transmitting station further includes a transmission buffer buffering incoming transmitted data and a timer managing time; and
the receiving station further includes a receipt buffer buffering received data in the received packet and a timer managing time,
wherein the expiration time information is defined in terms of a predetermined unit count which is changed on the basis of at least any one of a capacity of the transmission buffer, a capacity of the receipt buffer, accuracy of the timers of the transmitting station and the receiving station, and a type of the transmitted data.

57. A communications system including a transmitting station transmitting packets and a receiving station receiving packets, said system comprising:
the transmitting station including:
packet generating means for converting data to be transmitted to a predetermined packet;
expiration time calculating means for calculating an expiration time for at least part of data in the packet; and
expiration time appending means for appending expiration time information on the expiration time to the packet; and
the receiving station including:
expiration time determining means for determining expiration time for the packet on the basis of the expiration time information in a received packet, wherein in the receiving station:
the received packet is buffered up to a point in time immediately before an expiration time for the packet, so that data in the packet is output to an upper layer before the expiration time for the packet, wherein:
the transmitting station further includes a transmission buffer buffering incoming transmitted data and a timer managing time; and
the receiving station further includes a receipt buffer buffering received data in the received packet and a timer managing time,
wherein the expiration time information is defined in terms of Sequence Number which is changed on the basis of at least any one of a capacity of the transmission buffer, a capacity of the receipt buffer, accuracy of the timers of the transmitting station and the receiving station, and a type of the transmitted data.

58. A communications system including a transmitting station transmitting packets and a receiving station receiving packets, said system comprising:
the transmitting station including:
packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station:

the received packet is buffered up to a point in time immediately before an expiration time for the packet, so that data in the packet is output to an upper layer before the expiration time for the packet, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of absolute time which is changed on the basis of at least any one of a capacity of the transmission buffer, a capacity of the receipt buffer, accuracy of the timers of the transmitting station and the receiving station, and a type of the transmitted data.

59. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station:

the received packet is buffered up to a point in time immediately before an expiration time for the packet, so that data in the packet is output to an upper layer before the expiration time for the packet, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of relative time starting at a time when a packet is transmitted which is changed on the basis of at least any one of a capacity of the transmission buffer, a capacity of the receipt buffer, accuracy of the timers of the transmitting station and the receiving station, and a type of the transmitted data.

60. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station:

the received packet is buffered up to a point in time immediately before an expiration time for the packet, so that data in the packet is output to an upper layer before the expiration time for the packet, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of a packet retransmission count which is changed on the basis of at least any one of a capacity of the transmission buffer, a capacity of the receipt buffer, accuracy of the timers of the transmitting station and the receiving station, and a type of the transmitted data.

61. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station:

the received packet is buffered up to a point in time immediately before an expiration time for the packet, so that data in the packet is output to an upper layer before the expiration time for the packet, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of a predetermined unit count which is changed on the basis of at least any one of a capacity of the transmission buffer, a capacity of the receipt buffer, accuracy of the timers of the transmitting station and the receiving station, and a type of the transmitted data.

62. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station:

the received packet is buffered up to a point in time immediately before an expiration time for the packet, so that data in the packet is output to an upper layer before the expiration time for the packet, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of Sequence Number which is changed on the basis of at least any one of a capacity of the transmission buffer, a capacity of the receipt buffer, accuracy of the timers of the transmitting station and the receiving station, and a type of the transmitted data.

63. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time appending means for appending expiration time information on the expiration time to the packet; and the receiving station including:

expiration time determining means for determining expiration time for the packet on the basis of the expiration time information in a received packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of absolute time which is changed on the basis of at least any one of a capacity of the transmission buffer, a capacity of the receipt buffer, accuracy of the timers of the transmitting station and the receiving station, and a type of the transmitted data.

64. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time appending means for appending expiration time information on the expiration time to the packet; and the receiving station including:

expiration time determining means for determining expiration time for the packet on the basis of the expiration time information in a received packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of relative time starting when a packet is transmitted which is changed on the basis of at least any one of a capacity of the transmission buffer, a capacity of the receipt buffer, accuracy of the timers of the transmitting station and the receiving station, and a type of the transmitted data.

65. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time appending means for appending expiration time information on the expiration time to the packet; and the receiving station including:

expiration time determining means for determining expiration time for the packet on the basis of the expiration time information in a received packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of a packet retransmission count which is changed on the basis of at least any one of a capacity of the transmission buffer, a capacity of the receipt buffer, accuracy of the timers of the transmitting station and the receiving station, and a type of the transmitted data.

66. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time appending means for appending expiration time information on the expiration time to the packet; and the receiving station including:

expiration time determining means for determining expiration time for the packet on the basis of the expiration time information in a received packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of a predetermined unit count which is changed on the basis of at least any one of a capacity of the transmission buffer, a capacity of the receipt buffer, accuracy of the timers of the transmitting station and the receiving station, and a type of the transmitted data.

67. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time appending means for appending expiration time information on the expiration time to the packet; and the receiving station including:

expiration time determining means for determining expiration time for the packet on the basis of the expiration time information in a received packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of Sequence Number which is changed on the basis of at least any one of a capacity of the transmission buffer, a capacity of the receipt buffer, accuracy of the timers of the transmitting station and the receiving station, and a type of the transmitted data.

68. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of absolute time which is changed on the basis of at least any one of a capacity of the transmission buffer, a capacity of the receipt buffer, accuracy of the timers of the transmitting station and the receiving station, and a type of the transmitted data.

69. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of relative time starting at a time when a packet is transmitted which is changed on the basis of at least any one of a capacity of the transmission buffer, a capacity of the receipt buffer, accuracy of the timers of the transmitting station and the receiving station, and a type of the transmitted data.

71. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of a packet retransmission count which is changed on the basis of at least any one of a capacity of the transmission buffer, a capacity of the receipt buffer, accuracy of the timers of the transmitting station and the receiving station, and a type of the transmitted data.

71. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of predetermined unit count which is changed on the basis of at least any one of a capacity of the transmission buffer, a capacity of the receipt buffer, accuracy of the timers of the transmitting station and the receiving station, and a type of the transmitted data.

72. A communications system including a transmitting station transmitting packets and a receiving station receiving packets, said system comprising:

the transmitting station including:

packet generating means for converting data to be transmitted to a predetermined packet;

expiration time calculating means for calculating an expiration time for at least part of data in the packet; and expiration time packet generating means for generating an expiration time information packet containing expiration time information on the expiration time and identity information for data corresponding to the expiration time information; and the receiving station including:

expiration time determining means for determining expiration time for a received packet on the basis of the expiration time information in a received expiration time information packet, wherein in the receiving station, data in the packet is output to an upper layer immediately after the packet is received, if the received packet is following a transmission sequence, wherein:

the transmitting station further includes a transmission buffer buffering incoming transmitted data and a timer managing time; and the receiving station further includes a receipt buffer buffering received data in the received packet and a timer managing time, wherein the expiration time information is defined in terms of Sequence Number which is changed on the basis of at least any one of a capacity of the transmission buffer, a capacity of the receipt buffer, accuracy of the timers of the transmitting station and the receiving station, and a type of the transmitted data.

* * * * *

UNITED STATES PATENT AND TRADEMARK OFFICE
CERTIFICATE OF CORRECTION

PATENT NO. : 7,577,145 B2  Page 1 of 1
APPLICATION NO. : 10/482852
DATED : August 18, 2009
INVENTOR(S) : Maruyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1618 days.

Signed and Sealed this

Fourteenth Day of December, 2010

David J. Kappos
*Director of the United States Patent and Trademark Office*